United States Patent
Joseph et al.

(10) Patent No.: US 10,862,648 B2
(45) Date of Patent: Dec. 8, 2020

(54) CONTROL ELEMENTS TO CONFIGURE AND TRIGGER SOUNDING REFERENCE SIGNALS

(71) Applicant: QUALCOMM Incorporated, San Diego, CA (US)

(72) Inventors: Vinay Joseph, San Diego, CA (US); Rajat Prakash, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/521,412

(22) Filed: Jul. 24, 2019

(65) Prior Publication Data

US 2020/0059338 A1    Feb. 20, 2020

Related U.S. Application Data

(60) Provisional application No. 62/719,501, filed on Aug. 17, 2018.

(51) Int. Cl.
*H04L 5/00* (2006.01)
*H04W 72/12* (2009.01)

(52) U.S. Cl.
CPC ....... *H04L 5/0051* (2013.01); *H04W 72/1273* (2013.01)

(58) Field of Classification Search
None
See application file for complete search history.

(56) References Cited

U.S. PATENT DOCUMENTS

| 2019/0199496 A1 | 6/2019 | Qin et al. |
| 2019/0281588 A1* | 9/2019 | Zhang ................ H04L 5/0051 |
| 2019/0349161 A1* | 11/2019 | Jin ..................... H04W 56/001 |

FOREIGN PATENT DOCUMENTS

CN    108024365 A    5/2018

OTHER PUBLICATIONS

Huawei et al., "Need for new MAC CEs for UL and DL Beam Management", 3GPP DRAFT; R2-1712561, 3rd Generation Partnership Project (3GPP), Mobile Competence Centre, 650, Route Des Lucioles, F-06921 Sophia-Antipolis Cedex, France, vol. RAN WG2, No. Reno, Nevada, USA; Nov. 27, 2017-Dec. 1, 2017 Nov. 17, 2017, XP051371523, Retrieved from the Internet: URL:http://www.3gpp.org/ftp/tsg%5Fran/WG2%5FRL2/TSGR2%5F100/Docs [retrieved on Nov. 17, 2017], sections 1-2 and 4, 10 pages.

(Continued)

*Primary Examiner* — Hong S Cho
(74) *Attorney, Agent, or Firm* — Linda G. Gunderson; Holland & Hart LLP.

(57) ABSTRACT

Methods, systems, and devices providing for media access control (MAC) control element (CE) configuration and triggering of sounding reference signal (SRS) are described. For example, a MAC packet data unit (PDU) may include MAC CEs and may indicate (e.g., via one or more bits in fields included in the MAC PDU, such as a MAC subheader) that one or more MAC CEs include one or more SRS configuration parameters. Such SRS configuration parameters may be used by a wireless device to determine an SRS configuration, or to update or reconfigure SRS configuration parameters of an existing or previously defined SRS configuration. In some cases, downlink control information (DCI) may be coupled to a MAC CE, such that the coupled DCI may provide additional SRS configuration parameters to be used in conjunction with SRS parameters indicated by (Continued)

the MAC CE. In such cases, the MAC PDU may indicate a coupling configuration.

30 Claims, 18 Drawing Sheets

(56) References Cited

OTHER PUBLICATIONS

International Search Report and Written Opinion—PCT/US2019/043486—ISA/EPO—Oct. 28, 2019.

* cited by examiner

CONTROL ELEMENTS TO CONFIGURE AND TRIGGER SOUNDING REFERENCE SIGNALS

CROSS REFERENCE

The present application for patent claims the benefit of U.S. Provisional Patent Application No. 62/719,501 by JOSEPH et al., entitled "CONTROL ELEMENTS TO CONFIGURE AND TRIGGER SOUNDING REFERENCE SIGNALS," filed Aug. 17, 2018, assigned to the assignee hereof, and expressly incorporated by reference herein.

FIELD OF INVENTION

The following relates generally to wireless communications, and more specifically to media access control (MAC) control element (CE) triggering and MAC CE configuration of sounding reference signals (SRSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a set of stringent requirements for reliability and latency may be enforced for a specific service type. For example, a UE and base station may utilize ultra-reliable low latency communications (URLLC) that include reliability and latency requirements to attempt to ensure that messages are transmitted and received quickly and correctly. In some cases, different URLLC applications or services may be associated with different block error rate (BLER) targets or reliability targets (e.g., BLER of $10^{-5}$ or $10^{-9}$). In order to meet the reliability requirements, the base station may configure the UE to use coordinated multipoint (CoMP) techniques to achieve spatial diversity. These techniques may use multiple transmission reception points (TRPs) to communicate with a UE. The UE may send uplink reference signals (e.g., SRSs) for downlink channel estimations. In some cases, SRS configuration techniques may be too slow or inflexible considering the latency targets and BLER targets associated with URLLC applications or services.

SUMMARY

The described techniques relate to improved methods, systems, devices, and apparatuses that support control element (CE) configuration and triggering of sounding reference signals (SRSs). Generally, the described techniques provide for media access control (MAC) CE configuration and triggering of SRS. For example, a MAC packet data unit (PDU) may include MAC CEs and may indicate (e.g., via one or more bits in fields included in the MAC PDU, such as a MAC subheader) that one or more MAC CEs include one or more SRS configuration parameters. Such SRS configuration parameters may be used by the UE to determine an SRS configuration, or to update or reconfigure an existing or previously-defined SRS configuration. According to other aspects, downlink control information (DCI) may be coupled to a MAC CE. In such cases, a MAC PDU may indicate (e.g., via bits of a MAC subheader, bits of a MAC CE) a coupling configuration indicating a DCI coupled to the MAC CE. The coupled DCI may provide additional or complementary SRS configuration parameters to be used in conjunction with SRS parameters indicated by the MAC CE, or the coupled DCI may indicate an SRS configuration that is modified or reconfigured by one or more SRS parameters indicated by the MAC CE. The UE may identify the coupled DCI based on the coupling configuration, and may use SRS configuration parameters indicated by the coupled DCI, as well as SRS configuration parameters indicated by one or more MAC CEs of the MAC PDU, to determine an SRS configuration or to update or reconfigure an existing or previously defined SRS configuration.

For example, a base station may transmit a configuration for the UE to use to receive MAC CEs that include a set of SRS configuration parameters. The UE may then receive, according to the configuration, a MAC CE that includes at least one SRS configuration parameter of the set of SRS configuration parameters. The set of SRS configuration parameters may indicate one or more resource blocks (RBs), or one or more symbols, or a periodicity, or a cyclic shift, or a hopping configuration, or a sequence configuration, or a sequence hopping configuration, or one or more power control related parameters, or a repetition configuration, or an SRS density, or a resource element (RE) offset, or a time offset, or a combination thereof, for SRS sounding by the UE. The UE may then transmit (e.g., broadcast) SRSs based on the SRS configuration parameter. In some cases, the base station may transmit a MAC PDU that includes the one or more MAC CEs for UE SRS parameter configuration. The MAC PDU may indicate which MAC CEs indicate SRS configuration parameters, and in some cases may indicate a coupling configuration for a MAC CE with DCI coupling (e.g., the coupling configuration may indicate or identify a DCI that indicates additional SRS configuration parameters to be used in conjunction with the corresponding MAC CE).

A method of wireless communication at a UE is described. The method may include identifying a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The method may further include receiving, according to the identified configuration, a MAC CE that includes at least one SRS configuration parameter of the set of SRS configuration parameters, and transmitting an SRS based on the SRS configuration parameter.

An apparatus for wireless communication at a UE is described. The apparatus may include a processor, memory in electronic communication with the processor, and instructions stored in the memory. The instructions may be executable by the processor to cause the apparatus to identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The instructions may be further executable by the processor to cause the apparatus to receive, according to the identified configuration, a MAC CE that includes at least one SRS configuration parameter of the set of SRS configuration parameters, and transmit an SRS based on the SRS configuration parameter.

Another apparatus for wireless communication at a UE is described. The apparatus may include means for identifying a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, receiving, according to the identified configuration, a MAC CE that includes at least one SRS configuration parameter of the set of SRS configuration parameters, and transmitting an SRS based on the SRS configuration parameter.

A non-transitory computer-readable medium storing code for wireless communication at a UE is described. The code may include instructions executable by a processor to identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, receive, according to the identified configuration, a MAC CE that includes at least one SRS configuration parameter of the set of SRS configuration parameters, and transmit an SRS based on the SRS configuration parameter.

Some examples of the method, apparatuses, and non-transitory computer-readable medium described herein may further include operations, features, means, or instructions for receiving a MAC PDU that includes the MAC CE and an indication of a presence of the MAC CE in the MAC PDU. Some examples of the method, apparatuses, and non-transitory computer-readable medium described herein may further include operations, features, means, or instructions for identifying a DCI coupling configuration that indicates a DCI coupled to the MAC CE and receiving the indicated DCI, the DCI including at least one additional SRS configuration parameter for SRS transmissions. In some examples of the method, apparatuses, and non-transitory computer-readable medium described herein, the DCI coupling configuration indicates the DCI last received before the MAC CE, or the DCI next received after the MAC CE, or a time window to receive the DCI. In some examples of the method, apparatuses, and non-transitory computer-readable medium described herein, receiving the MAC CE may include operations, features, means, or instructions for receiving a MAC PDU that includes a header and the MAC CE, the header indicating the DCI coupling configuration. In some examples of the method, apparatuses, and non-transitory computer-readable medium described herein, the received MAC CE indicates the DCI coupling configuration.

In some examples of the method, apparatuses, and non-transitory computer-readable medium described herein, transmitting the SRS may include operations, features, means, or instructions for transmitting the SRS based on the SRS configuration parameter and the at least one additional SRS parameter. In some examples of the method, apparatuses, and non-transitory computer-readable medium described herein, the time offset indicates a delay for updating an SRS configuration from a time of reception of the DCI coupled to the MAC CE.

In some examples of the method, apparatuses, and non-transitory computer-readable medium described herein, the at least one additional SRS configuration parameter indicates one or more RBs, or one or more symbols, or a periodicity, or a cyclic shift, or a hopping configuration, or a sequence configuration, or a sequence hopping configuration, or one or more power control parameters, or a repetition configuration, or an SRS density, or a RE offset, a time offset for updating an SRS configuration from a time a DCI coupled to the MAC CE may be received, or a time offset for updating an SRS configuration for SRS transmission from a time the MAC CE may be received, or a combination thereof.

In some examples of the method, apparatuses, and non-transitory computer-readable medium described herein, the time offset indicates a delay for updating the SRS configuration from a time of reception of the MAC CE. Some examples of the method, apparatuses, and non-transitory computer-readable medium described herein may further include operations, features, means, or instructions for updating an SRS configuration based on the SRS configuration parameter indicated by the MAC CE and transmitting the SRS based on the updated SRS configuration. Some examples of the method, apparatuses, and non-transitory computer-readable medium described herein may further include operations, features, means, or instructions for receiving the configuration to use to receive MAC CEs in DCI, or radio resource control (RRC) signaling, a different MAC CE, or a non-access stratum (NAS) message, or a combination thereof.

In some examples of the method, apparatuses, and non-transitory computer-readable medium described herein, the SRS transmission may be triggered based on receiving the MAC CE. Some examples of the method, apparatuses, and non-transitory computer-readable medium described herein may further include operations, features, means, or instructions for transmitting a UE capability indication and receiving the configuration to use to receive MAC CEs based on the transmitted UE capability indication.

Some examples of the method, apparatuses, and non-transitory computer-readable medium described herein may further include operations, features, means, or instructions for receiving RRC signaling that includes at least one additional SRS configuration parameter. In some examples of the method, apparatuses, and non-transitory computer-readable medium described herein, the at least one additional SRS configuration parameter includes a set of SRS configuration parameters and a corresponding SRS resource identifier, and the SRS configuration parameter of the MAC CE includes an indication of the SRS resource identifier.

A method of wireless communication at a base station is described. The method may include transmitting a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, transmitting, to the UE according to the transmitted configuration, a MAC CE that includes at least one SRS configuration parameter of the set of SRS configuration parameters, and receiving an SRS transmitted by the UE according to the SRS configuration parameter.

An apparatus for wireless communication at a base station is described. The apparatus may include a processor, memory in electronic communication with the processor, and instructions stored in the memory. The instructions may be executable by the processor to cause the apparatus to transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, transmit, to the UE according to the transmitted configuration, a MAC CE that includes at least one SRS configuration parameter of the set of SRS configuration parameters, and receive an SRS transmitted by the UE according to the SRS configuration parameter.

Another apparatus for wireless communication at a base station is described. The apparatus may include means for transmitting a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, transmitting, to the UE according to the transmitted configuration, a MAC CE that includes at least one SRS configuration parameter of the set of SRS configuration parameters, and receiving an SRS transmitted by the UE according to the SRS configuration parameter.

A non-transitory computer-readable medium storing code for wireless communication at a base station is described. The code may include instructions executable by a processor to transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, transmit, to the UE according to the transmitted configuration, a MAC CE that includes at least one SRS configuration parameter of the set of SRS configuration parameters, and receive an SRS transmitted by the UE according to the SRS configuration parameter.

Some examples of the method, apparatuses, and non-transitory computer-readable medium described herein may further include operations, features, means, or instructions for transmitting a MAC PDU that includes the MAC CE and an indication of a presence of the MAC CE in the MAC PDU. Some examples of the method, apparatuses, and non-transitory computer-readable medium described herein may further include operations, features, means, or instructions for identifying a DCI coupling configuration that indicates a DCI coupled to the MAC CE and transmitting the indicated DCI, the DCI including at least one additional SRS configuration parameter for SRS transmissions by the UE. In some examples of the method, apparatuses, and non-transitory computer-readable medium described herein, the DCI coupling configuration indicates the DCI last transmitted before the MAC CE, or the DCI next transmitted after the MAC CE, or a time window the DCI was transmitted in, or a time window the DCI will be transmitted in. In some examples of the method, apparatuses, and non-transitory computer-readable medium described herein, transmitting the MAC CE may include operations, features, means, or instructions for transmitting a MAC PDU that includes a header and the MAC CE, the header indicating the DCI coupling configuration. In some examples of the method, apparatuses, and non-transitory computer-readable medium described herein, the transmitted MAC CE indicates the DCI coupling configuration.

In some examples of the method, apparatuses, and non-transitory computer-readable medium described herein, receiving the SRS may include operations, features, means, or instructions for receiving the SRS transmitted by the UE according to the SRS configuration parameter and the at least one additional SRS parameter. In some examples of the method, apparatuses, and non-transitory computer-readable medium described herein, the time offset indicates a delay for updating an SRS configuration from a time of reception of the DCI coupled to the MAC CE.

In some examples of the method, apparatuses, and non-transitory computer-readable medium described herein, the at least one additional SRS configuration parameter indicates one or more RBs, or one or more symbols, or a periodicity, or a cyclic shift, or a hopping configuration, or a sequence configuration, or a sequence hopping configuration, or one or more power control parameters, or a repetition configuration, or an SRS density, or a RE offset, or a time offset for updating an SRS configuration from a time a DCI coupled to the MAC CE may be received, or a time offset for updating an SRS configuration for SRS transmission from a time the MAC CE may be received, or a combination thereof. In some examples of the method, apparatuses, and non-transitory computer-readable medium described herein, the time offset indicates a delay for updating the SRS configuration from a time of reception of the MAC CE.

In some examples of the method, apparatuses, and non-transitory computer-readable medium described herein, the configuration for the UE to use to receive MAC CEs may be transmitted in DCI, or RRC signaling, a different MAC CE, or a NAS message, or a combination thereof. In some examples of the method, apparatuses, and non-transitory computer-readable medium described herein, the MAC CE may be transmitted to trigger the SRS transmission. Some examples of the method, apparatuses, and non-transitory computer-readable medium described herein may further include operations, features, means, or instructions for receiving a UE capability indication and transmitting the configuration for the UE to use to receive MAC CEs based on the received UE capability indication.

Some examples of the method, apparatuses, and non-transitory computer-readable medium described herein may further include operations, features, means, or instructions for transmitting RRC signaling that includes at least one additional SRS configuration parameter. In some examples of the method, apparatuses, and non-transitory computer-readable medium described herein, the at least one additional SRS configuration parameter includes a set of SRS configuration parameters and a corresponding SRS resource identifier, and the SRS configuration parameter of the MAC CE includes an indication of the SRS resource identifier.

DETAILED DESCRIPTION

Figure 1:
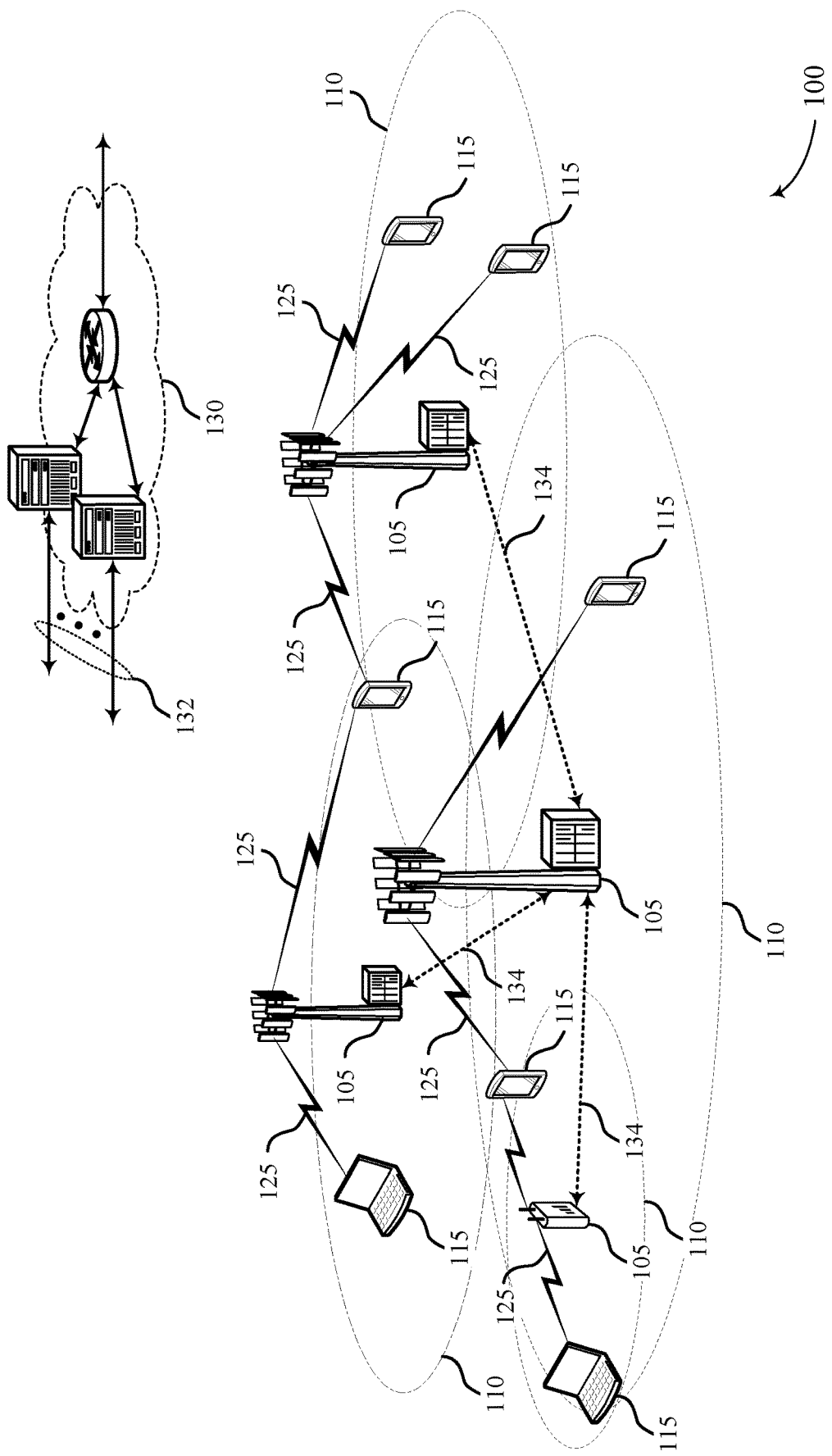
FIG. 1 illustrates an example of a system for wireless communications that supports media access control (MAC) control element (CE) triggering and MAC CE configuration of sounding reference signal (SRS) in accordance with aspects of the present disclosure.

Some wireless communications systems may require a set of reliability and latency specifications to enable a service where messages are communicated correctly and on time. For example, ultra-reliable low latency communication (URLLC) may include a requirement associated with reliability (e.g., $1\times10^{-5}$ block error rate (BLER), $1\times10^{-6}$ BLER, $1\times10^{-9}$ BLER) and a requirement associated with latency (e.g., 1 millisecond (ms) end-to-end). In some scenarios, wireless communications systems may employ multiple transmission reception points (TRPs) to serve a user equipment (UE) for joint processing or coordinated multi-point (CoMP) techniques to satisfy such latency and reliability requirements. Joint processing or CoMP techniques for transmissions from multiple TRPs to a UE may, for example, improve link reliability, increase throughput, etc.

For example, in some dense urban environments or factory automation settings a relatively large number of devices (e.g., base stations and UEs) may be present in a small area. Further, some applications such as industrial internet of things (IIoT), factory automation, etc. may demand highly granular or tight coordination in control (e.g., such as in positioning), which may be achievable using multi-TRP transmissions. In order to satisfy latency and reliability requirements, a base station may configure a UE with a sounding reference signal (SRS) configuration for downlink channel estimation. Such downlink channel estimations may be useful in maintaining reliable downlink channels for satisfying BLER requirements (e.g., downlink channel estimations may be used by a base station or network to maintain or alter TRP configurations). For example, downlink channels jointly used by two TRPs may degrade or improve due to, for example, varying interference (e.g., such that different downlink precoding should be used, a different TRP configuration should be used). Downlink channel estimations may be used to determine downlink precoding given the estimated channel conditions, identify degrading channels (e.g., such that new channels may be used by a given configuration of TRPs), identify potentially enhanced TRP configurations (e.g., new or altered TRP configurations for joint transmissions to the UE), etc.

Some techniques for configuring or adapting SRSs may be insufficient for communications with more stringent latency and reliability requirements (e.g., such as URLLC). For example, it may be efficient to configure a UE to sound an SRS on a small set of resource blocks (RBs) containing physical downlink shared channel (PDSCH) RBs associated (e.g., allocated) with the UE (e.g., for downlink channel estimation on those RBs). In some examples, the UE may be constrained to sound an SRS on the small set of RBs associated with the UE, to the exclusion of other RBs. In some cases (e.g., for IIoT, factory automation environments), radio frequency spectrum for communications may be dynamic as interference conditions may vary due to dense deployments of UEs and base stations. As such, PDSCH allocations may need to be updated quickly (e.g., within 1 ms, or within 5 ms) to adjust to interference conditions and adhere to latency and reliability requirements. When a PDSCH allocation update results in change to PDSCH RBs, SRS configurations may also need to be adapted quickly such that SRSs may be transmitted on the updated set of PDSCH RBs (e.g., such that downlink precoding may be updated according to downlink channel estimations on the updated set of PDSCH RBs, while adhering to latency and reliability requirements). Radio resource control (RRC) based approaches for SRS configuration adaptation may be flexible in terms of configurable SRSs, but may be time consuming. Techniques used to trigger an SRS that has already been configured by RRC may be relatively less time consuming, but may be inflexible as such techniques may only trigger a preconfigured SRS.

The techniques described herein provide for faster and more flexible SRS configuration. Media access control (MAC) control elements (CEs) may be used for configuration and triggering of SRS (e.g., a base station may transmit MAC CEs to configure UE SRS transmission). For example, a MAC packet data unit (PDU) may include MAC CEs and may indicate (e.g., via one or more bits in fields included in the MAC PDU, such as a MAC subheader) that one or more MAC CEs include one or more SRS configuration parameters. Such SRS configuration parameters may be used by the UE to determine an SRS configuration, or to update or reconfigure an existing or previously defined SRS configuration. According to other aspects of the invention, downlink control information (DCI) may be coupled to a MAC CE. In such cases, a MAC PDU may indicate (e.g., via bits of a MAC subheader, bits of a MAC CE) a coupling configuration indicating a DCI coupled to the MAC CE. The coupled DCI may provide additional SRS configuration parameters to be used in conjunction with SRS parameters indicated by the MAC CE, or the coupled DCI may indicate an SRS configuration that is modified or reconfigured by one or more SRS parameters indicated by the MAC CE. The UE may identify the coupled DCI based on the coupling configuration, and may use SRS configuration parameters indicated by the coupled DCI, as well as SRS configuration parameters indicated by one or more MAC CEs of the MAC PDU, to determine an SRS configuration or to update or reconfigure an existing or previously defined SRS configuration.

Beneficially, the described techniques using MAC CEs (e.g., and in some cases coupled DCI) for SRS parameter and transmission configuration may be faster than higher layer SRS configuration techniques (e.g., RRC based SRS reconfiguration), which configuration or reconfiguration may occur less frequently and with higher latency. Additionally, the described techniques may provide additional flexibility in SRS configuration over other lower layer SRS configuration techniques (e.g., layer 1 (L1) based SRS reconfiguration such as carrying out SRS configuration using DCI) as SRS configuration parameters may be explicitly signaled via MAC CEs, rather than otherwise being limited to triggering of one of a limited set of preconfigured SRS configurations (for example, preconfigured via RRC signaling). Further, the described techniques may provide such additional flexibility without impacting physical downlink control channel (PDCCH) capacity (PDCCH capacity may be limited in a network serving large number of UEs). As MAC CEs are carried over PDSCH, and may in some cases be configured to be used in conjunction with coupled DCI, increased SRS configuration flexibility may be realized without additional DCI or PDCCH signaling overhead.

Particular aspects of the subject matter described herein may be implemented to realize one or more advantages. The described techniques may support improvements in interference management, efficiency, and SRS configuration flexibility, among other advantages. As such, supported techniques may include improved network operations and, in some examples, may promote network efficiencies, among other benefits.

Aspects of the disclosure are initially described in the context of a wireless communications system. An additional wireless communications system, a MAC PDU, and process flows are then provided to portray aspects of the disclosure. Aspects of the disclosure are further illustrated by and described with reference to apparatus diagrams, system diagrams, and flowcharts that relate to MAC CE configuration and MAC CE triggering of SRSs.

FIG. 1 illustrates an example of a wireless communications system 100 that supports MAC CE configuration and MAC CE triggering of SRSs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, a Central Unit, one or more Distributed Units, one or more TRPs, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving (e.g., "deep sleep") mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (NAS) (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFMD (DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation (CA) configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme). The more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may require a set of reliability and latency specifications to enable a service where messages are communicated correctly and on time. For example, the service may include URLLC for one or more UEs 115 and base stations 105. The URLLC may include a requirement associated with reliability (e.g., $10^{-6}$ BLER) and a requirement associated with latency (e.g., 1 ms end-to-end latency). To satisfy the reliability requirement, a UE 115 may sound uplink SRS for base station channel estimation, such that the base station may provide reliable communications to the UE.

Figure 2:
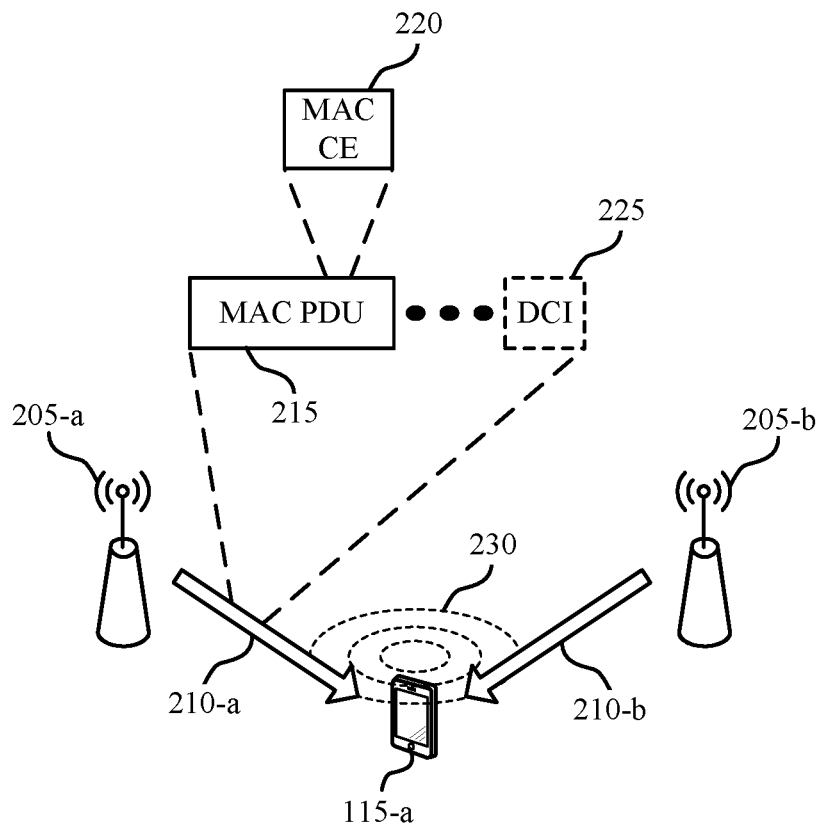
FIG. 2 illustrates an example of a wireless communications system that supports MAC CE triggering and MAC CE configuration of SRS in accordance with aspects of the present disclosure.

Wireless communications system 100 may support efficient techniques to trigger and configure SRSs via MAC CEs. For example, base stations 105 may transmit MAC PDUs that may include MAC CEs and may indicate (e.g., via one or more bits in fields included in the MAC PDU, such as a MAC subheader) that one or more MAC CEs include one or more SRS configuration parameters. Such SRS configuration parameters may be used by UEs 115 to determine SRS configurations, or to update or reconfigure existing or previously defined SRS configurations. Further, wireless communications system 100 may support DCI coupled to MAC CEs. In such cases, MAC PDUs may indicate (e.g., via bits of a MAC subheader, bits of a MAC CE) a coupling configuration indicating a DCI coupled to a MAC CE. The coupled DCI may provide additional SRS configuration parameters to be used in conjunction with SRS parameters indicated by the MAC CE, or the coupled DCI may indicate an SRS configuration that is modified or reconfigured by one or more SRS parameters indicated by the MAC CE. UEs 115 may identify the coupled DCI based on the coupling configuration, and may use SRS configuration parameters indicated by the coupled DCI, as well as SRS configuration parameters indicated by one or more MAC CEs of the MAC PDU, to determine an SRS configuration or to update or reconfigure an existing or previously defined SRS configuration FIG. 2 illustrates an example of a wireless communications system 200 that supports MAC CE configuration and MAC CE triggering of SRSs in accordance with aspects of the present disclosure. In some examples, wireless communications system 200 may implement aspects of wireless communications system 100. For example, wireless communications system 200 may include a UE 115-*a*, as well as TRP 205-*a* and TRP 205-*b* which may be associated with a base station 105, all of which may be examples of the corresponding devices as described with reference to FIG. 1. In wireless communications system 200, a base station may transmit MAC PDU 215 to UE 115-*a*. Wireless communications system 200 may employ multi-TRP transmissions (e.g., transmissions from TRP 205-*a* and TRP 205-*b*) via downlink 210-*a* and downlink 210-*b* (e.g., DCI, downlink RRC signaling).

As described with reference to FIG. 1, a base station 105 may include subcomponents such as an access network entity, and each access network entity may communicate with UE 115-*a* through a number of other access network transmission entities (e.g., such as a remote radio head (RRH), a smart radio head, a TRP). Various functions of each access network entity or base station 105 may be distributed across various network devices (e.g., radio heads, access network controllers, TRPs 205) or consolidated into a single network device (e.g., a base station 105). TRP 205-*a* and TRP 205-*b* may refer to different antenna ports associated with a cell ID, and may be collocated or distributed. For example, TRP 205-*a* may refer to a base station 105 and TRP 205-*b* may refer to an RRH associated with the base station 105. In other examples, TRP 205-*a* and TRP 205-*b* may each be an RRH associated with a same base station 105.

Some wireless communications systems (e.g., wireless communications system 200) may employ multiple TRPs (e.g., TRP 205-*a* and TRP 205-*b*) to serve a UE 115-*a* (e.g., to improve link reliability, increase throughput). For example, for low latency, high reliability applications (e.g., for URLLC), spatial diversity achievable by multi-TRP downlink transmission may be desired. With multi-TRP transmission, UE 115-*a* may receive downlink communications (e.g., PDSCH transmission, PDCCH transmission) through TRP 205-*a* and TRP 205-*b*. TRP 205-*a* and TRP 205-*b* may jointly transmit information (e.g., employing CoMP techniques) to UE 115-*a* (e.g., via transmissions on downlink 210-*a* and transmissions on downlink 210-*b*). Such CoMP techniques may be used to achieve desired spatial diversity (e.g., using coherent joint transmission techniques, non-coherent joint transmissions).

Downlink CoMP transmissions (e.g., joint downlink transmissions from TRP 205-*a* and TRP 205-*b*) may be adapted based on downlink channel conditions. For example, precoding used for downlink transmissions may be updated or adapted based on downlink channel conditions. The network or base station may configure (e.g., through TRPs 205) UE 115-*a* to send or broadcast SRS 230 (e.g., according to some SRS configuration). TRP 205-*a* and TRP 205-*b* may measure broadcast SRS 230 to estimate downlink channels and adapt downlink transmissions (e.g., precoding used for downlink transmissions) accordingly.

In cases where the downlink and uplink channels share similar characteristics (e.g., in time division duplexing (TDD) configurations), uplink SRSs 230 may be used to estimate downlink channels. For example, the network may configure UE 115-*a* to broadcast SRS 230 on a set of PDSCH RBs, and TRP 205-*a* and TRP 205-*b* may measure the strength and phase of the SRS 230 transmitted on the downlink channel (e.g., the uplink SRS 230 broadcast on the set of PDSCH RBs corresponding to the downlink channel), and adapt downlink transmission parameters (e.g., downlink precoding) accordingly. As discussed above, to adhere to latency and reliability requirements (e.g., to adhere to URLLC), PDSCH allocations may be updated quickly (e.g., within 1-5 ms). When a PDSCH allocation update results in change to PDSCH RBs, SRS configurations may also be adapted such that SRS 230 may be transmitted on the updated set of PDSCH RBs (e.g., such that downlink precoding may be updated according to downlink channels estimations on the updated set of PDSCH RBs).

The techniques described herein may provide for more rapid SRS configuration updating and may increase flexibility in SRS configuration updating. For example, using the described techniques, an SRS configuration may be updated or reconfigured using a MAC CE 220 that indicates an SRS configuration parameter, such as an indication of which RBs the UE 115-*a* is to use for sounding of SRS 230. That is, a MAC CE 220 may be used to update or reconfigure which PDSCH RBs should be used by the UE 115-*a* for broadcasting of SRS 230. Utilization of MAC CEs 220 to update such SRS configuration parameters may be quicker than higher layer signaling (e.g., RRC signaling) based SRS reconfiguration, and may provide increased SRS configuration flexibility without impacting PDCCH capacity, as MAC CEs 220 may be signaled via PDSCH (e.g., an DCI, whether coupled to a MAC CE 220 or not, may not need to be altered).

An SRS configuration may be determined by one or more SRS configuration parameters. SRS configuration parameters may include one or more RBs for sounding of an SRS (e.g., a set of PDSCH RBs to SRS broadcast), one or more symbols in which to broadcast an SRS, a periodicity for SRS broadcasting, a cyclic shift associated with an SRS transmission, a hopping configuration (e.g., a frequency hopping configuration or a pattern of RBs to use for SRS sounding), one or more power control parameters for SRS broadcast, a repetition configuration, an SRS density, an RE offset, a time offset for updating an SRS configuration from a time a DCI coupled to the MAC CE is received, or any combination thereof. In some cases, SRS configuration parameters may refer to other parameters used to characterize or define how an SRS is to be broadcast or transmitted by UE 115-*a*.

Generally, MAC CEs 220 may indicate one or more SRS configuration parameters that may be used in conjunction with other SRS configuration parameters (e.g., from DCI and/or RRC signaling) to configure SRS, or may be used to update or reconfigure certain SRS configuration parameters (e.g., to update or reconfigure certain SRS configuration parameters of some SRS configuration established by DCI and/or RRC signaling, effectively reconfiguring the SRS configuration). For example, in some cases, RRC signaling may configure a set of one or more SRS configuration parameters (e.g., that are more static such as periodicity), and the set may correspond to an SRS resource ID. If such SRS resource IDs are used, the MAC CE 220 may trigger and configure multiple SRS resources (e.g., the MAC CE may include the desired SRS resource ID to point to a specific RRC configuration). In some cases, MAC CEs 220 may be used to indicate all SRS configuration parameters (e.g., in which case SRS configuration parameters indicated by MAC CEs 220 may be used independently to determine an SRS configuration).

As an example, RRC signaling may be used to configure SRS configuration parameters that are more static (e.g., such as SRS periodicity), and MAC CEs 220 may be used to update or configure other SRS configuration parameters (e.g., the set of PDSCH RBs that should be used for sounding an SRS). As such, UE 115-*a* may efficiently reconfigure an SRS (e.g., as in some scenarios, such as URLLC, allocations of PDSCH for UE 115-*a* may frequently change to adhere to more stringent latency and reliability requirements) without additional RRC configuration and/or additional PDCCH overhead. As another example, a MAC CE 220 may be coupled to DCI, such that DCI may be used to configure more static SRS configuration parameters or to establish some baseline SRS configuration (e.g., in some cases DCI may be used to indicate an SRS configuration established by RRC signaling). MAC CEs 220 may then be used to provide SRS configuration parameters not specified by the DCI indication, or to update or reconfigure one or more SRS configuration parameters indicated by the DCI. As such, UE 115-*a* may efficiently reconfigure an SRS by using MAC CEs 220 along with aspects of established DCI (e.g., along with SRS configuration parameters included in a coupled DCI 225), without needing to modify DCI or signal additional PDCCH.

A MAC PDU 215 may include one or more MAC CEs 220, and may specify (e.g., in one or more bits of a MAC subheader, one or more bits of a MAC CE 220, or both) whether MAC CEs 220 with SRS configuration parameter indications are included in the MAC PDU 215. For example, the MAC PDU 215 may indicate which MAC CEs 220 (e.g., which MAC CE identifications (IDs)) indicate SRS configuration parameters, may indicate all included MAC CEs 220 indicate SRS configuration parameters, etc. The UE 115-*a* may receive the MAC PDU 215 and identify which SRS configuration parameters are indicated by MAC CEs 220 included in the MAC PDU 215 (e.g., via referencing a look up table (LUT)). The UE 115-*a* may determine an SRS configuration based on the SRS configuration parameters indicated by the MAC CEs 220, or may modify or reconfigure some existing SRS configuration (e.g., identified from other RRC signaling or DCI).

In some examples, MAC CEs 220 may be coupled to DCI (e.g., a MAC CE 220 may be associated with a couple DCI 225). In such cases, the MAC PDU 215 may indicate (e.g., in one or more bits of a MAC subheader, one or more bits of a MAC CE 220, or both) a coupling configuration that may indicate the coupled DCI 225 to the UE 115-*a*. For example, the coupling configuration may indicate a coupled DCI 225 corresponds to the DCI last received by the UE 115-*a*, to the next DCI received by the UE 115-*a*, or to a DCI received in some specified time window (e.g., as further described herein with reference to FIG. 4). As discussed herein, the UE 115-*a* may determine an SRS configuration based on the SRS configuration parameters indicated by the MAC CE 220 and the coupled DCI 225, or UE 115-*a* may modify or reconfigure some existing SRS configuration indicated by the coupled DCI 225, using the SRS configuration parameters indicated by the MAC CE 220. For example, the coupled DCI 225 may indicate one or more SRS parameters, or may indicate an SRS configuration configured by RRC, and the UE 115-*a* may modify or supplement an SRS configuration identified from the coupled DCI 225 using the MAC CE 220.

For example, coupled DCI 225 may indicate SRS configuration parameters such as symbols used for SRS, periodicity, cyclic shift, hopping configuration, power control related parameters, density, sequence hopping, RE offset, etc. In some cases, the associated coupled DCI 225 may indicate SRS configuration parameters including SRS RBs which may be the same as PDSCH RBs (e.g., RBs used for SRS, which may be the same as RBs indicated by frequency domain resource assignment field in the DCI). In some cases, coupled DCI 225 may indicate a time offset (e.g., in slots or symbols) for delay in updating SRS (e.g., starting from a time a reception of the coupled DCI 225). The MAC CE 220 (e.g., the MAC CE coupled to the DCI) may indicate SRS configuration parameters such as symbols used for SRS, periodicity, cyclic shift, hopping configuration, power control related parameters, density, sequence hopping, RE offset, etc. In some cases, the MAC CE 220 may indicate a time offset (e.g., in slots or symbols) for delay in updating an SRS starting from the time of reception of the MAC CE 220, starting from the time of reception of the DCI associated with the MAC CE (e.g., starting from the time of reception of the coupled DCI 225), etc.

In some cases, the network (e.g., a base station 105) may configure UE 115-*a* to use MAC CEs according to the techniques described. For example, the network may configure the UE 115-*a* to use one or more MAC CEs to trigger and configure an SRS. In some cases, the network may configure the UE 115-*a* to use DCI coupled MAC CEs and may provide a coupling configuration. In some cases, the network configuration may be based on a UE capability indication (e.g., indicating UE 115-*a* capabilities, such as SRS transmission capabilities, antenna switching capabilities, memory storage capabilities). The network may configure such using RRC signaling, MAC CEs, NAS messaging, DCI, etc. For example, the network may configure UE 115-*a* to use MAC CEs according to the techniques described, and the TRPs 205-*a* and 205-*b* may jointly send MAC PDUs 215 that may indicate whether that MAC PDUs 215 include MAC CEs 220 with SRS configuration parameters, DCI coupled MAC CEs 220, etc. In other cases, the MAC PDUs 215 may independently configure UE 115-*a* according to the techniques described (e.g., the MAC PDUs 215 may configure and indicate usage of MAC CEs/DCI coupled MAC CEs for SRS configuration parameters without prior network configuration).

Figure 3:
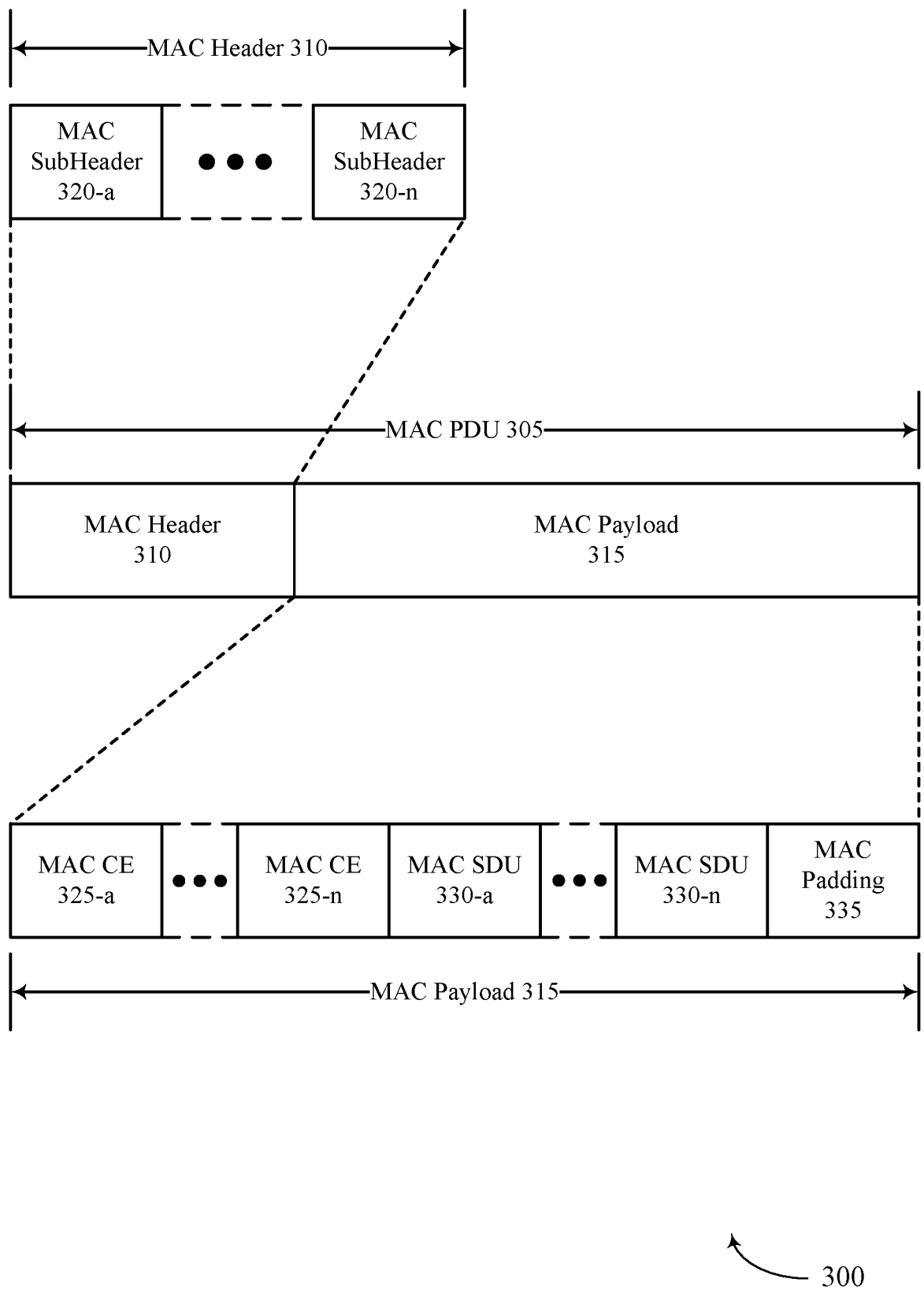
FIG. 3 illustrates an example of a MAC mapping scheme that supports MAC CE triggering and MAC CE configuration of SRS in accordance with aspects of the present disclosure.

FIG. 3 illustrates an example of a MAC mapping scheme 300 that supports MAC CE triggering and MAC CE configuration of SRS in accordance with aspects of the present disclosure. In some examples, MAC mapping scheme 300 may implement aspects of wireless communication system 100 and/or 200. As described herein, a base station 105 may transmit a MAC PDU 305 to a UE 115 to for MAC CE 325 configuration and triggering of SRS. MAC PDU 305 may include a MAC header 310 and a MAC payload 315. The MAC mapping 300 in FIG. 3 is one example of a MAC mapping scheme. The described techniques may be implemented via other configurations of MAC PDUs 305 by analogy, without departing from the scope of the present disclosure. That is, MAC subheaders 320 and MAC CEs 325 may be arranged differently within MAC PDU 305 while still configuring and triggering SRS in accordance with the described techniques. For example, in some cases, MAC PDU 305 may alternatively be divided into one or more MAC subPDUs, where each MAC subPDU includes a MAC subheader 320 and a variable sized MAC CE 325. Further, in some cases additional fields may be present within the MAC PDU 305 or, in some cases, some fields may be removed from MAC PDU 305. In some cases, the subheaders may be dispersed within the MAC PDU, e.g., not grouped together. These, and other mapping schemes may also be used, including for example MAC mappings as discussed in Rel-15 version of 3GPP TS 38.321, for examples using those shown and described with reference to FIGS. 6.1.2-4 and/or 6.1.2-5 in Rel-15 version of 3GPP TS 38.321.

MAC header 310 may include one or more MAC subheaders 320. Each MAC subheader 320 may contain a logical channel identification (LCID) of one MAC CE 325 in MAC payload 315, which indicates a type of the MAC CE 325. For example, the types of MAC CEs 325 may include CEs for SRS configuration parameters as described herein, as well as CEs for power control, CEs for secondary cell activation/deactivation in a CA configuration, CEs for service type mode activation/deactivation, etc. Accordingly, each MAC subheader 320 may map to a separate MAC CE 325 in MAC payload 315. MAC payload 315 may further include one or more MAC service data units (SDUs) 330 and a MAC padding 335, where MAC SDUs 330 include additional information for the UE 115 and MAC padding 335 fills out the rest of MAC PDU 305 in cases where MAC SDUs 330 are small and do not fill MAC PDU 305.

As described herein, when a MAC CE 325 is defined for SRS configuration parameters, an LCID may be allocated for this MAC CE 325. The LCID field in MAC subheader 320 may denote the corresponding MAC CE 325 type. As such, if the base station 105 signals the LCID in a MAC subheader 320, the UE 115 may receive the corresponding MAC CE 325 and configure or reconfigure the SRS configuration accordingly. In some cases, the MAC CE 325 may include a MAC subheader 320 (e.g., with the LCID indicating the MAC CE 325 type) and MAC CE content. In some cases, the MAC subheader 320 may correspond to a MAC sub-PDU contained in the MAC CE 325.

For example, a MAC header 310 may include a MAC subheader 320-*a* that indicates MAC CE 325-*a* includes one or more SRS configuration parameters. In some cases, MAC header 310 may include more than one MAC subheaders 320 that indicate multiple MAC CEs 325 include SRS configuration parameters. In some examples, one or more bits of MAC subheader 320-*a* may indicate a coupling configuration indicating a coupled DCI associated with the MAC CE 325-*a*. In other cases, the MAC subheader 320-*a* may indicate MAC CE 325-*a* indicates SRS configuration parameters (e.g., via a LCID field of the MAC subheader 320-*a*) and one or more bits of the MAC CE 325-*a* may indicate the coupling configuration. Possible coupling configurations (e.g., potential locations of coupled DCI corresponding to a MAC CE) are further described herein with reference to FIG. 4.

Figure 4A:
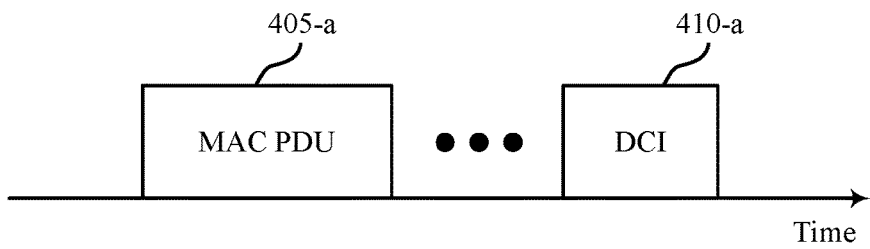
FIG. 4A-4C illustrates examples of downlink control information (DCI) and MAC CE coupling configurations that support MAC CE triggering and MAC CE configuration of SRS in accordance with aspects of the present disclosure.
Figure 4B:
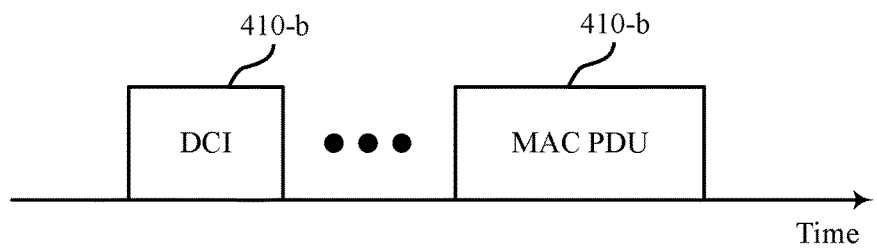
Figure 4C:
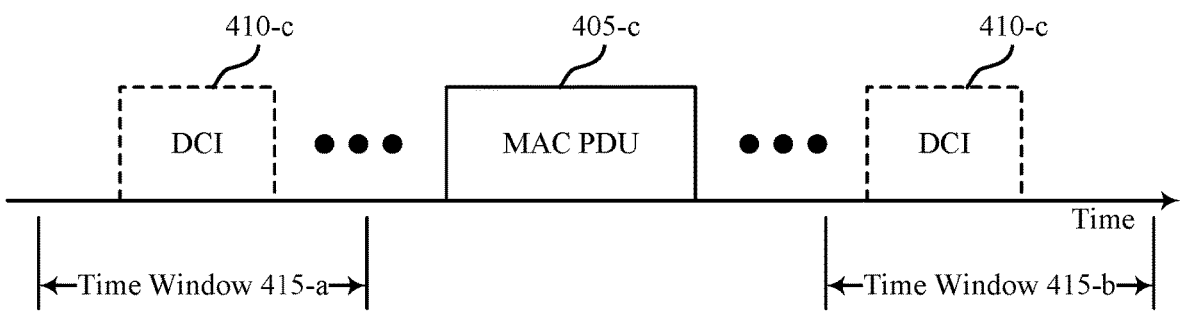

FIG. 4A-4C illustrates an example of a coupling configuration 400, an example of a coupling configuration 401, and an example of a coupling configuration 402 that support MAC CE configuration and MAC CE triggering of SRSs in accordance with aspects of the present disclosure. In some examples, coupling configuration 400, coupling configuration 401, and coupling configuration 402 may implement aspects of wireless communications systems 100 and/or 200. As described herein, a base station 105 may transmit a MAC PDU 405 to a UE 115 indicating one or coupling configuration 400, coupling configuration 401, or coupling configuration 402.

DCI (e.g., a DCI message) may be scrambled by a radio network temporary identifier (RNTI) associated with the service type, and UE 115 may monitor the DCI message using the RNTI associated with the service type. As such, a coupling configuration indicated by a MAC PDU 405 may indicate a specific coupling between a MAC CE (e.g., a DCI coupled MAC CE indicated by, for example, a MAC subheader of the MAC PDU) and a DCI with CRC encoded using a configured scheduling radio network temporary identifier (CS-RNTI), or cell radio network temporary identifier (CRNTI) configured by the base station.

For example, a MAC PDU 405-*a* may indicate coupling configuration 400 where a MAC CE (e.g., indicated by the MAC PDU 405-*a*) is coupled with a next received DCI 410-*a* with CRC encoded using a CS-RNTI or CRNTI configured for the UE 115 (e.g., the coupled DCI 410-*a* may correspond to the next DCI the UE 115-*a* receives). MAC PDU 405-*b* may indicate coupling configuration 401 where a MAC CE (e.g., indicated by the MAC PDU 405-*b*) is coupled with a last received DCI 410-*b* with CRC encoded using a CS-RNTI or CRNTI configured for the UE 115 (e.g., the coupled DCI 410-*b* may correspond to the last DCI received by the UE 115-*a*). MAC PDU 405-*c* may indicate coupling configuration 402 where a MAC CE (e.g., indicated by the MAC PDU 405-*c*) is coupled with a DCI 410-*c* with CRC encoded using a CS-RNTI or CRNTI configured for the UE 115 that is received in some specified time window 415. For example, the coupled DCI 410-*c* may correspond to a DCI the UE 115 receives in a time window 415-*a* that may have already occurred prior to the UE 115 receiving the MAC PDU 405-*c*, or the coupled DCI 410-*c* may correspond to a DCI the UE 115 receives in a time window 415-*b* that may occur after the UE 115 receives the MAC PDU 405-*c*.

Figure 5:
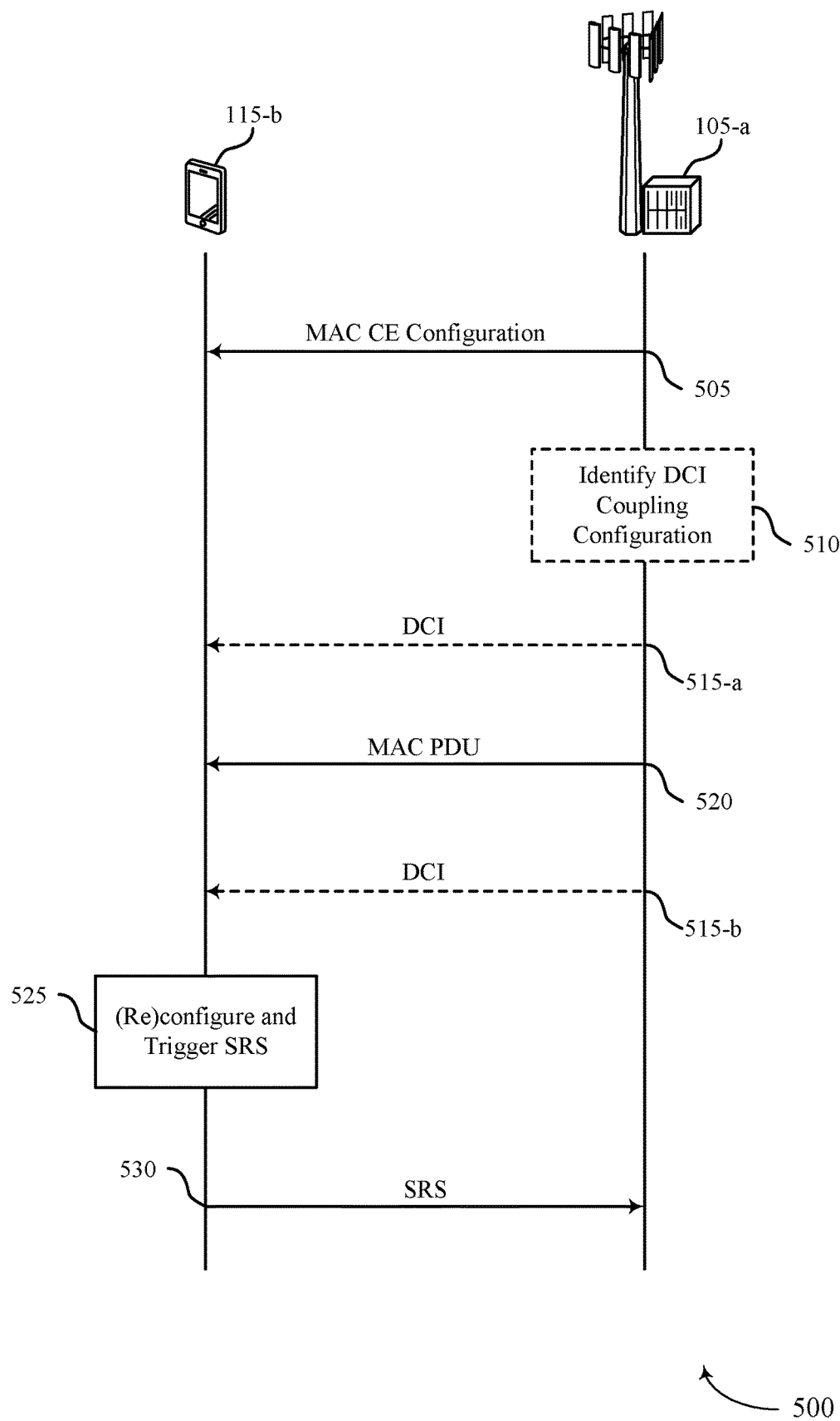
FIG. 5 illustrates an example of a process flow that supports MAC CE triggering and MAC CE configuration of SRS in accordance with aspects of the present disclosure.

FIG. 5 illustrates an example of a process flow 500 that supports MAC CE triggering and MAC CE configuration of SRS in accordance with aspects of the present disclosure. In some examples, process flow 500 may implement aspects of wireless communications system 100 and wireless communications system 200. Process flow 500 includes base station 105-*a* and UE 115-*b*, which may be examples of a UE 115 and base stations 105 as described with reference to FIGS. 1-2. Process flow 500 may illustrate a base station 105-*a* configuring UE 115-*b* SRS. As discussed above, base station 105-*a* may utilize multi-TRP joint transmissions (e.g., CoMP techniques) to communicate with UE 115-*b*. As such, in some cases the signaling shown in process flow 500 may be from multiple TRPs associated with the base station 105-*a*, transmitted to the UE 115-*b* using CoMP techniques. In the following description of the process flow 500, the operations between the base station 105-*a* and the UE 115-*b* may be transmitted in a different order than the exemplary order shown, or the operations performed by base station 105-*a* and UE 115-*b* may be performed in different orders or at different times. In some cases, certain operations may also be left out of the process flow 500, or other operations may be added to the process flow 500.

At 505, base station 105-*a* may transmit a configuration for UE 115-*b* to use to receive MAC CEs that indicate a set of SRS configuration parameters. In some cases, the configuration may be based on a UE capability indication received from the UE 115-*b*. In some cases, the configuration for the UE 115-*b* to use to receive MAC CEs is transmitted by the base station 105-*a* in DCI, or RRC signaling, a different MAC CE, or a NAS message, or a combination thereof.

At 510, base station 105-*a* may, in some cases, identifying a DCI coupling configuration that indicates a DCI coupled to a MAC CE. For example, the coupling configuration may be included in or indicated by the MAC PDU transmitted at 520. Further, the coupling configuration may indicate a DCI that is coupled to the MAC CE included in the MAC PDU transmitted at 520, where the coupled DCI indicated by the coupling configuration may be transmitted at 515-*a* (e.g., prior to the transmission of the MAC PDU transmitted at 520) or at 515-*b* (e.g., after the transmission of the MAC PDU transmitted at 520). Aspects of the DCI coupling configuration is further described herein, with reference to FIGS. 2-4.

At 520, the base station 105-*a* may transmit a MAC PDU to the UE 115-*b*. The UE 115-*b* may receive the MAC PDU, and may, according to the configuration received at 505, identify one or more MAC CEs, included in the MAC PDU, that indicate one or more SRS configuration parameters. The SRS configuration parameters may indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. In some cases, the MAC PDU may indicate the presence of one or more MAC CEs (e.g., that indicate SRS configuration parameters) included in the MAC PDU. In some cases, the MAC PDU may indicate the presence of a DCI coupling configuration (e.g., determined by the base station 105-*a* at 510), where the DCI coupling configuration indicates a DCI (e.g., transmitted by the base station 105-*a* at 515-*a* or 515-*b*) coupled to a MAC CE included in the MAC PDU. In such cases, the UE 115-*b* may receive the indicated DCI (e.g., in cases where the coupled DCI is transmitted after the corresponding MAC CE) or may recall the DCI (e.g., in cases where the MAC PDU indicates a DCI previously transmitted) based on the MAC PDU indicated DCI coupling configuration.

At 525, the UE 115-*a* may configure, or reconfigure, an SRS configuration. For example, at 525, the UE 115-*a* may determine an SRS configuration based on SRS configuration parameters received in MAC CEs, in coupled DCIs, or in some cases, in previous RRC signaling. In other examples, the UE 115-*a* may identify an SRS configuration (e.g., based on the coupled DCI, previous RRC signaling) and may update one or more SRS configuration parameters of the SRS configuration based on the received MAC CEs. For example, additional SRS configuration parameters (e.g., indicated by coupled DCI, previous RRC signaling) may be used along with, or updated by, SRS configuration parameters indicated by the one or more MAC CEs included in the MAC PDU received at 520. Such additional SRS configuration parameters may indicate one or more RBs, one or more symbols, a periodicity, a cyclic shift, a hopping configuration, a sequence configuration, a sequence hopping configuration, one or more power control parameters, a repetition configuration, an SRS density, a RE offset, a time offset for updating an SRS configuration from a time a DCI coupled to the MAC CE is received, a time offset for updating an SRS configuration for SRS transmission from a time the MAC CE is received, or any combination thereof.

At 530, UE 115-*b* may transmit an SRS which may be received by base station 105-*a* via one or more TRP associated with base station 105-*a* (e.g., based on the SRS configuration identified or established at 525). For example, in some cases, the SRS may be transmitted by UE 115-*b* based on SRS configuration parameters indicated by one or more received MAC CEs (e.g., included in the MAC PDU received at 520) and one or more additional SRS configuration parameters (e.g., indicated by coupled DCI, RRC signaling, other MAC CEs).

Figure 6:
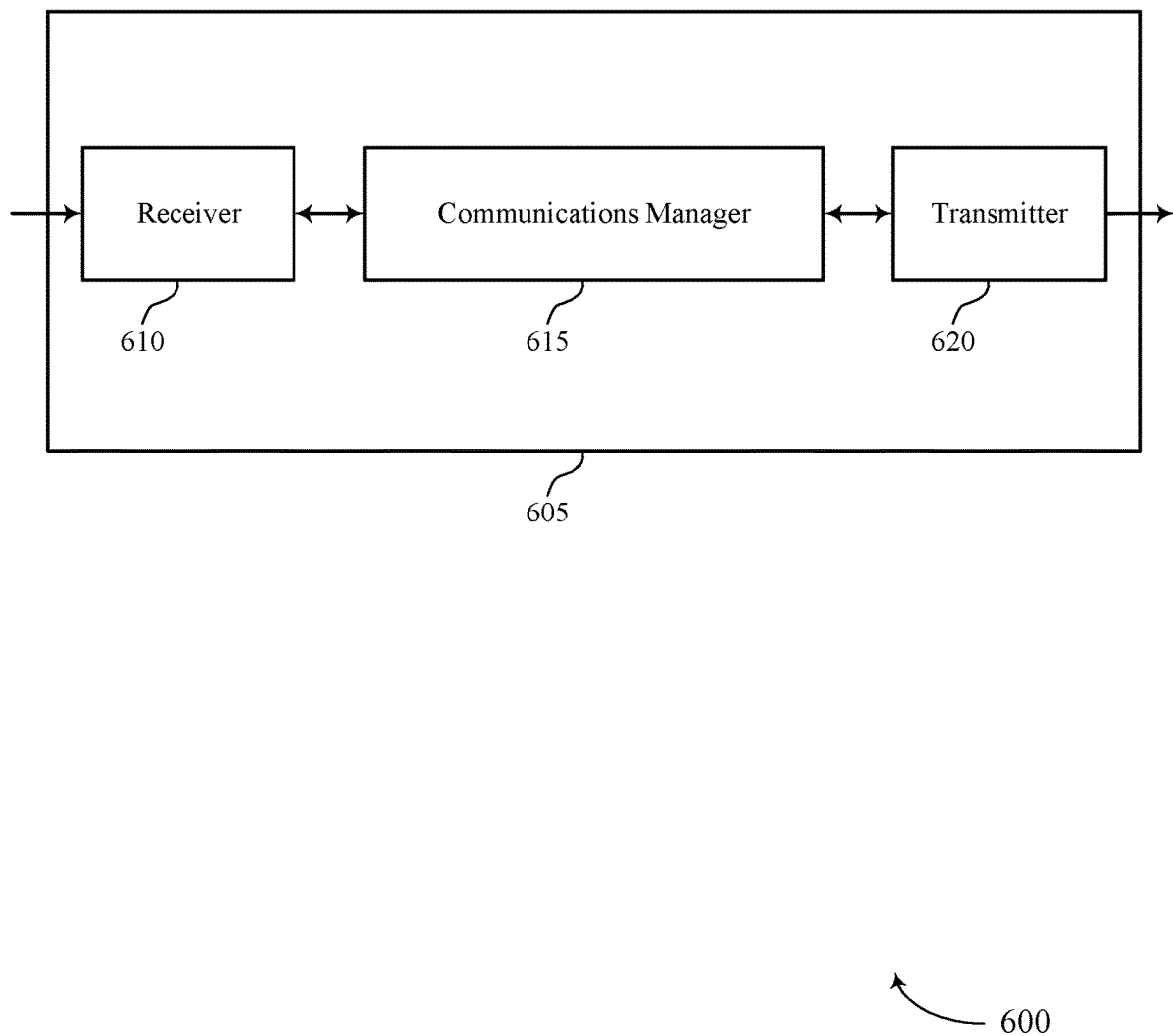
FIGS. 6 and 7 show block diagrams of devices that support MAC CE triggering and MAC CE configuration of SRS in accordance with aspects of the present disclosure.

FIG. 6 shows a block diagram 600 of a device 605 that supports MAC CE triggering and MAC CE configuration of SRS in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to MAC CE triggering and MAC CE configuration of SRS). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, receive, according to the identified configuration, a MAC CE that includes at least one SRS configuration parameter of the set of SRS configuration parameters, and transmit an SRS based on the SRS configuration parameter. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 as described herein may be implemented to realize one or more potential advantages. One implementation may allow the device 605 to increase efficiency and flexibility of SRS configuration by including SRS configuration parameters in MAC CEs in a MAC PDU. For example, the device 605 may utilize the indicated SRS parameters to determine an SRS configuration, or to update or reconfigure an existing or previously defined SRS configuration to reduce latency at the device 605. Another implementation may allow the device 605 to determine an SRS configuration from additional SRS configuration parameters indicated in coupled DCI that may be used in conjunction with SRS parameters indicated by the MAC CE.

Based on implementing MAC CE configuration of SRS as described herein, a processor of a UE 115 (e.g., controlling the receiver 610, the transmitter 620, or the transceiver 920 as described with reference to FIG. 9) may improve flexibility and reduce latency at the UE 115 and more efficiently utilize system resources at a base station 105 and a UE 115.

Figure 7:
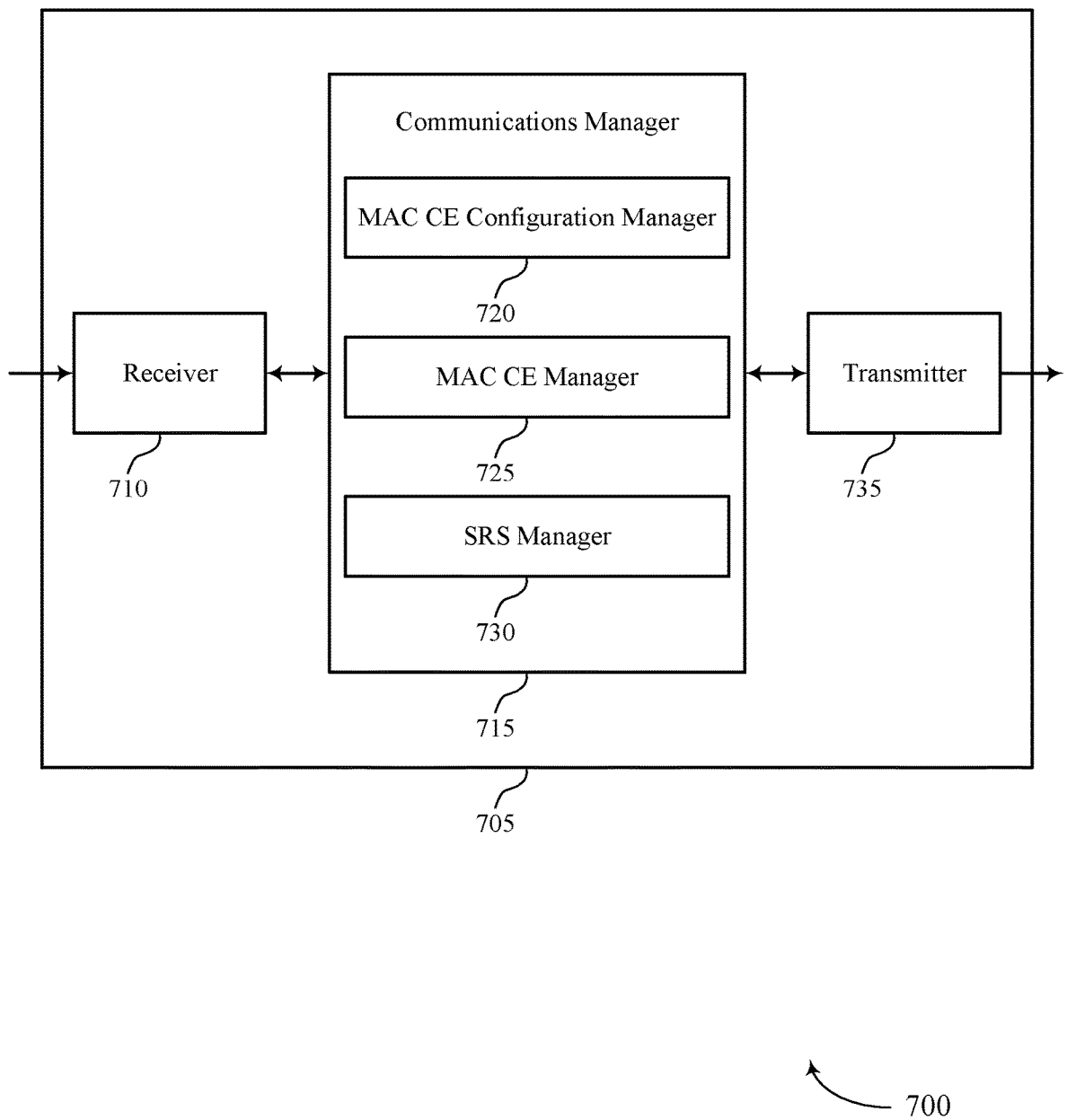

FIG. 7 shows a block diagram 700 of a device 705 that supports MAC CE triggering and MAC CE configuration of SRS in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to MAC CE triggering and MAC CE configuration of SRS). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a MAC CE configuration manager 720, a MAC CE manager 725, and an SRS manager 730. The communications manager 715 may be an example of aspects of the communications manager 910 described herein.

The MAC CE configuration manager 720 may identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The MAC CE manager 725 may receive, according to the identified configuration, a MAC CE that includes at least one SRS configuration parameter of the set of SRS configuration parameters. The SRS manager 730 may transmit an SRS based on the SRS configuration parameter.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
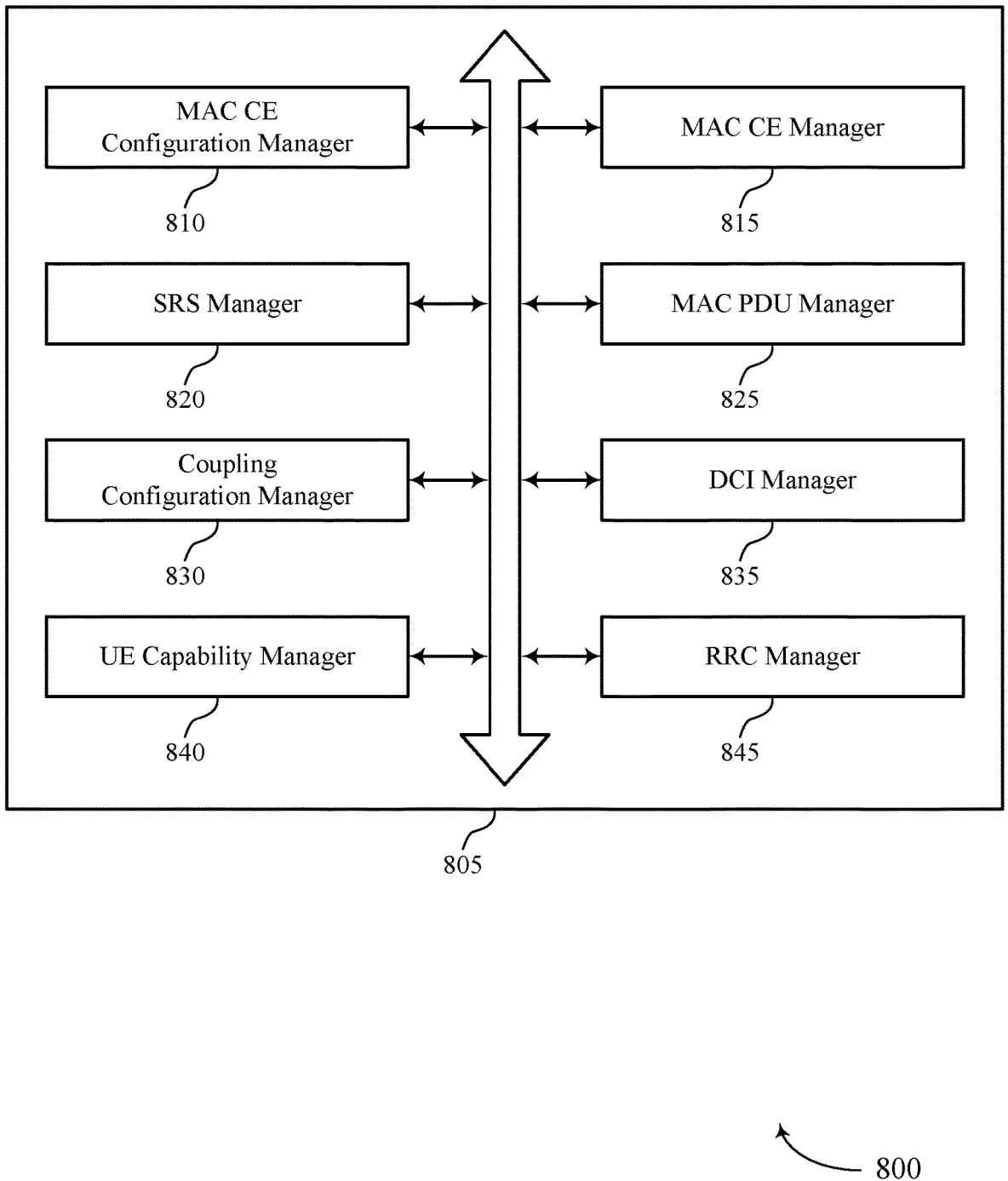
FIG. 8 shows a block diagram of a communications manager that supports MAC CE triggering and MAC CE configuration of SRS in accordance with aspects of the present disclosure.

FIG. 8 shows a block diagram 800 of a communications manager 805 that supports MAC CE triggering and MAC CE configuration of SRS in accordance with aspects of the present disclosure. The communications manager 805 may be an example of aspects of a communications manager 615, a communications manager 715, or a communications manager 910 described herein. The communications manager 805 may include a MAC CE configuration manager 810, a MAC CE manager 815, an SRS manager 820, a MAC PDU manager 825, a coupling configuration manager 830, a DCI manager 835, a UE capability manager 840, and an RRC manager 845. Each of these modules may communicate, directly or indirectly, with one another (e.g., via one or more buses).

The MAC CE configuration manager 810 may identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. In some examples, the MAC CE configuration manager 810 may receive the configuration to use to receive MAC CEs in DCI, or RRC signaling, a different MAC CE, or a NAS message, or a combination thereof. In some examples, the MAC CE configuration manager 810 may receive the configuration to use to receive MAC CEs based on the transmitted UE capability indication.

The MAC CE manager 815 may receive, according to the identified configuration, a MAC CE that includes at least one SRS configuration parameter of the set of SRS configuration parameters.

The SRS manager 820 may transmit an SRS based on the SRS configuration parameter. In some examples, the SRS manager 820 may transmit the SRS based on the SRS configuration parameter and the at least one additional SRS parameter. In some examples, the SRS manager 820 may update an SRS configuration based on the SRS configuration parameter indicated by the MAC CE. In some examples, the SRS manager 820 may transmit the SRS based on the updated SRS configuration. In some cases, the time offset indicates a delay for updating an SRS configuration from a time of reception of the DCI coupled to the MAC CE. In some cases, the time offset indicates a delay for updating the SRS configuration from a time of reception of the MAC CE. In some cases, the SRS transmission is triggered based on receiving the MAC CE.

The MAC PDU manager 825 may receive a MAC PDU that includes the MAC CE and an indication of a presence of the MAC CE in the MAC PDU. In some examples, receiving a MAC PDU that includes a header and the MAC CE, the header indicating the DCI coupling configuration.

The coupling configuration manager 830 may identify a DCI coupling configuration that indicates a DCI coupled to the MAC CE. In some cases, the DCI coupling configuration indicates the DCI last received before the MAC CE, or the DCI next received after the MAC CE, or a time window to receive the DCI. In some cases, the received MAC CE indicates the DCI coupling configuration.

The DCI manager 835 may receive the indicated DCI, the DCI including at least one additional SRS configuration parameter for SRS transmissions. In some cases, the at least one additional SRS configuration parameter indicates one or more RBs, or one or more symbols, or a periodicity, or a cyclic shift, or a hopping configuration, or a sequence configuration, or a sequence hopping configuration, or one or more power control parameters, or a repetition configuration, or an SRS density, or a RE offset, a time offset for updating an SRS configuration from a time a DCI coupled to the MAC CE is received, or a time offset for updating an SRS configuration for SRS transmission from a time the MAC CE is received, or a combination thereof.

The UE capability manager 840 may transmit a UE capability indication.

The RRC manager 845 may receive RRC signaling that includes at least one additional SRS configuration parameter. In some cases, the at least one additional SRS configuration parameter includes a set of SRS configuration parameters and a corresponding SRS resource identifier, and the SRS configuration parameter of the MAC CE includes an indication of the SRS resource identifier.

Figure 9:
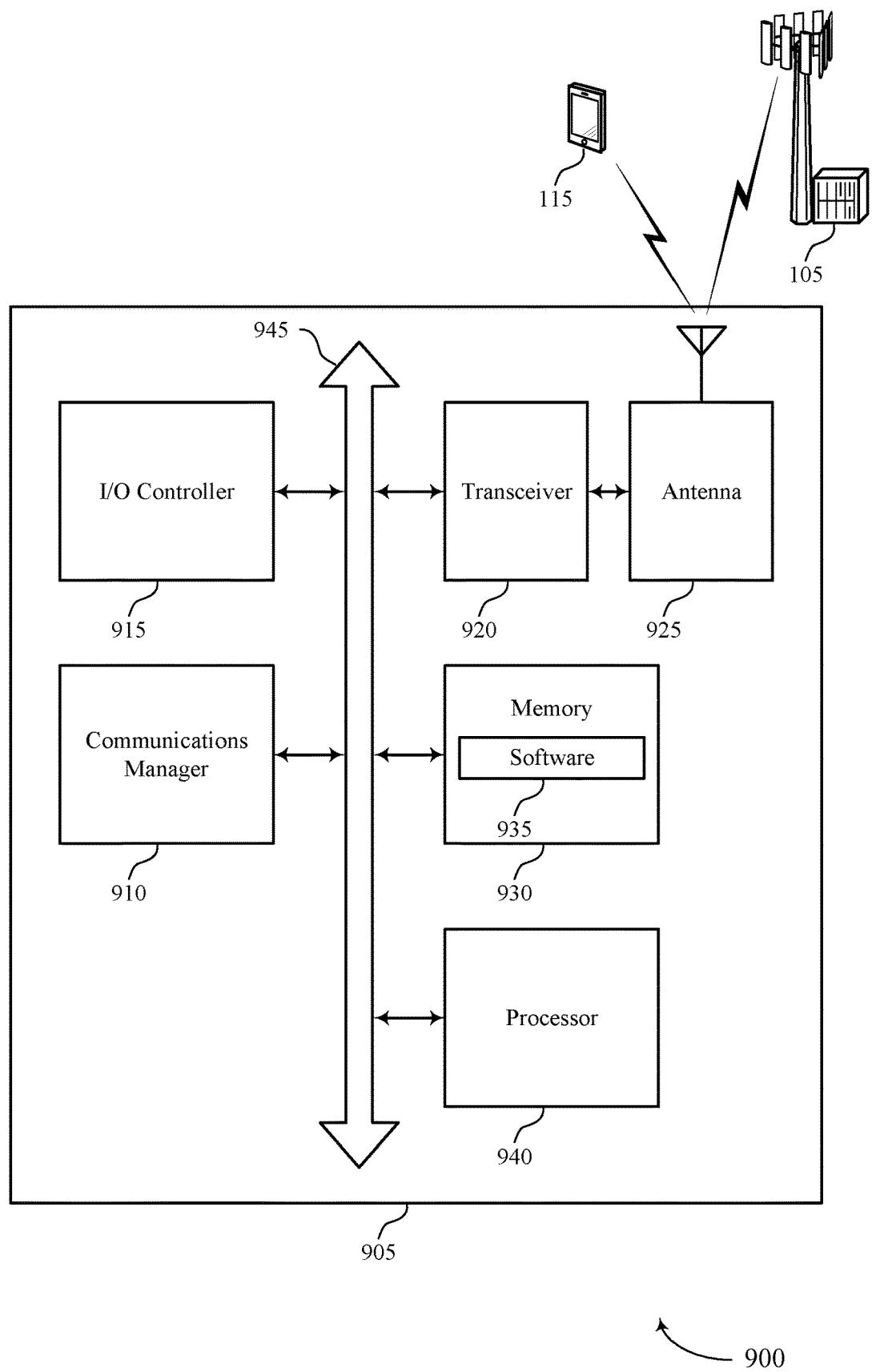
FIG. 9 shows a diagram of a system including a device that supports MAC CE triggering and MAC CE configuration of SRS in accordance with aspects of the present disclosure.

FIG. 9 shows a diagram of a system 900 including a device 905 that supports MAC CE triggering and MAC CE configuration of SRS in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, receive, according to the identified configuration, a MAC CE that includes at least one SRS configuration parameter of the set of SRS configuration parameters, and transmit an SRS based on the SRS configuration parameter.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting MAC CE triggering and MAC CE configuration of SRS).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
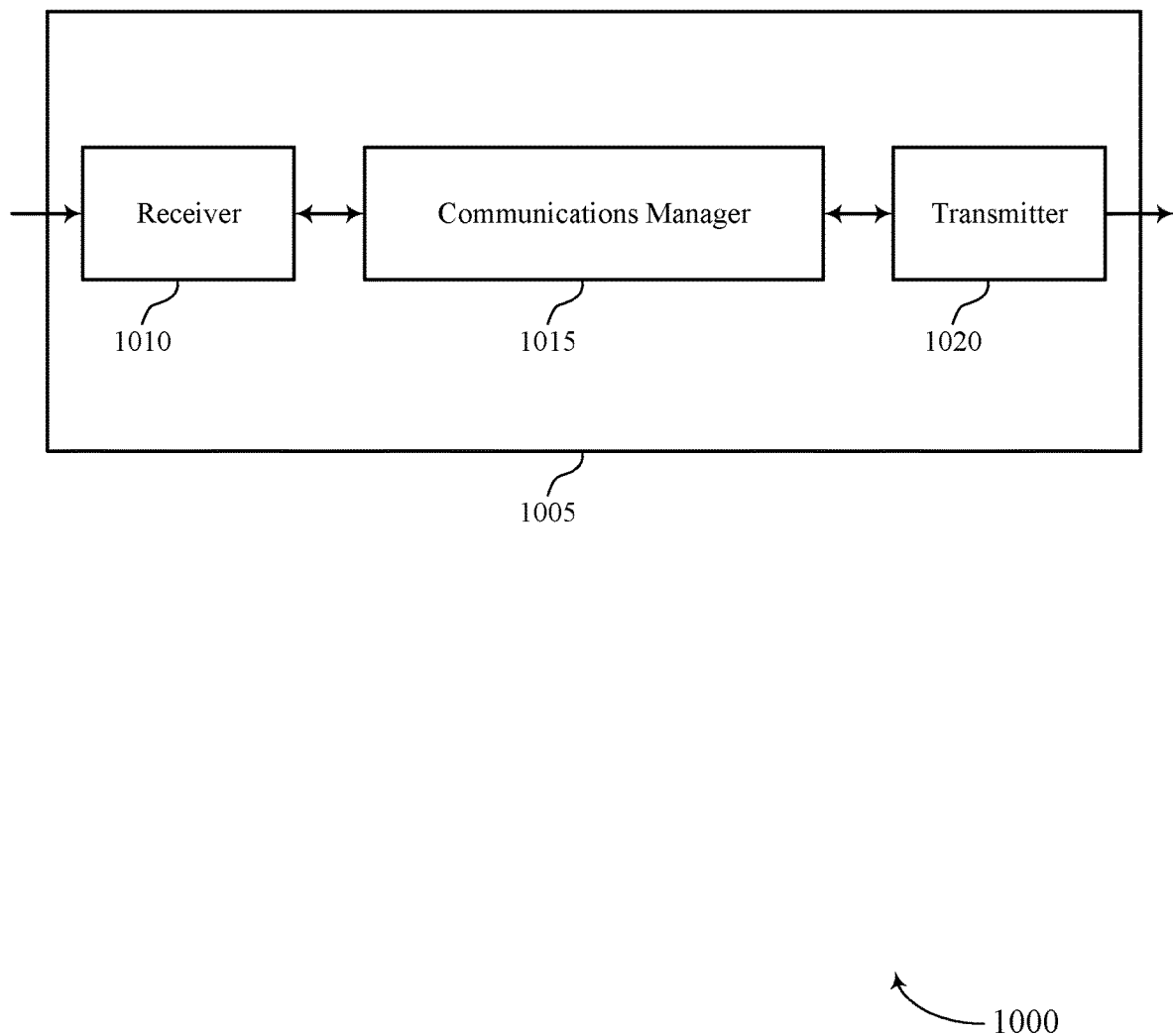
FIGS. 10 and 11 show block diagrams of devices that support MAC CE triggering and MAC CE configuration of SRS in accordance with aspects of the present disclosure.

FIG. 10 shows a block diagram 1000 of a device 1005 that supports MAC CE triggering and MAC CE configuration of SRS in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to MAC CE triggering and MAC CE configuration of SRS). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, transmit, to the UE according to the transmitted configuration, a MAC CE that includes at least one SRS configuration parameter of the set of SRS configuration parameters, and receive an SRS transmitted by the UE according to the SRS configuration parameter. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
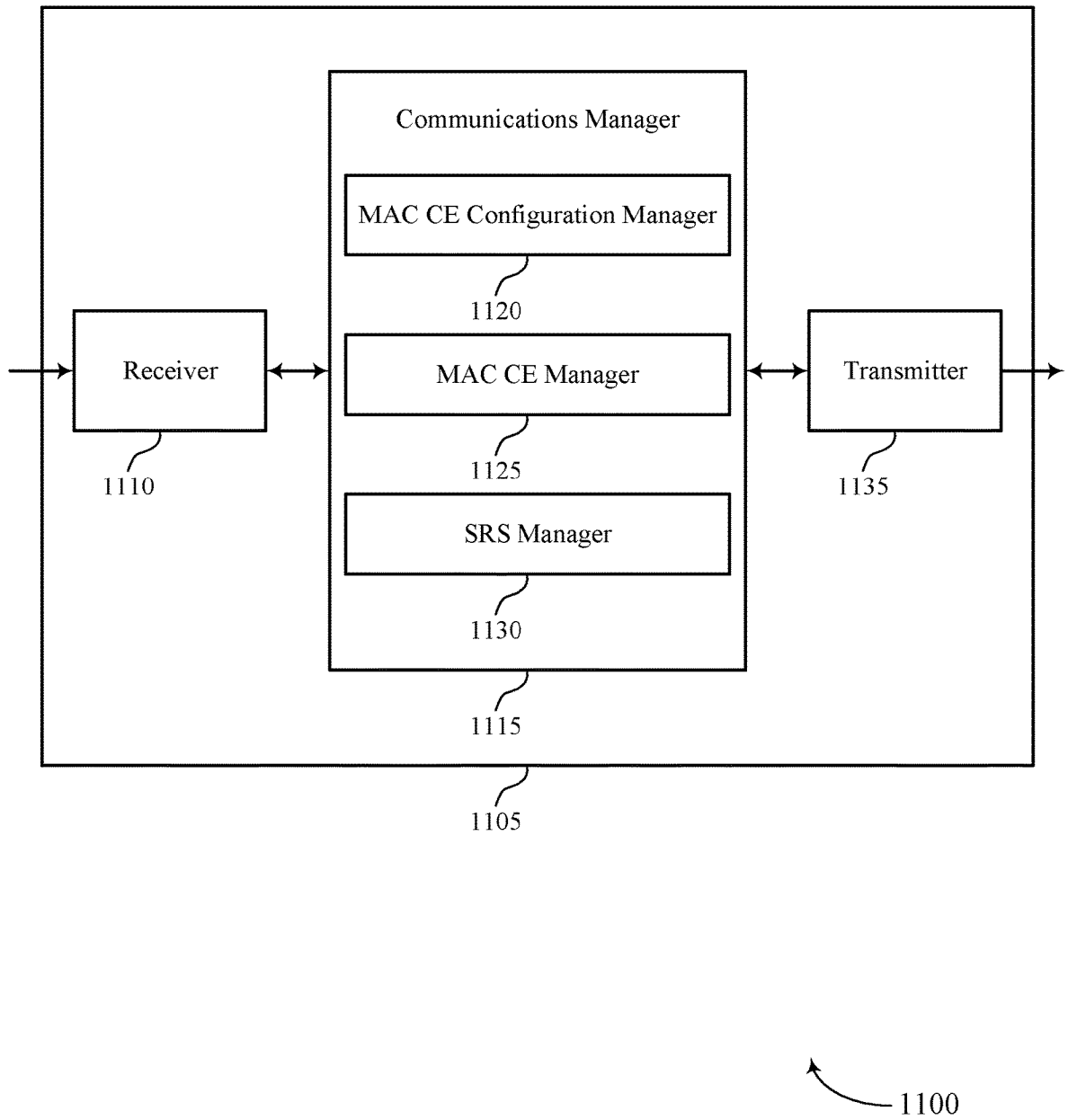

FIG. 11 shows a block diagram 1100 of a device 1105 that supports MAC CE triggering and MAC CE configuration of SRS in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to MAC CE triggering and MAC CE configuration of SRS). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a MAC CE configuration manager 1120, a MAC CE manager 1125, and an SRS manager 1130. The communications manager 1115 may be an example of aspects of the communications manager 1310 described herein.

The MAC CE configuration manager 1120 may transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The MAC CE manager 1125 may transmit, to the UE according to the transmitted configuration, a MAC CE that includes at least one SRS configuration parameter of the set of SRS configuration parameters. The SRS manager 1130 may receive an SRS transmitted by the UE according to the SRS configuration parameter.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
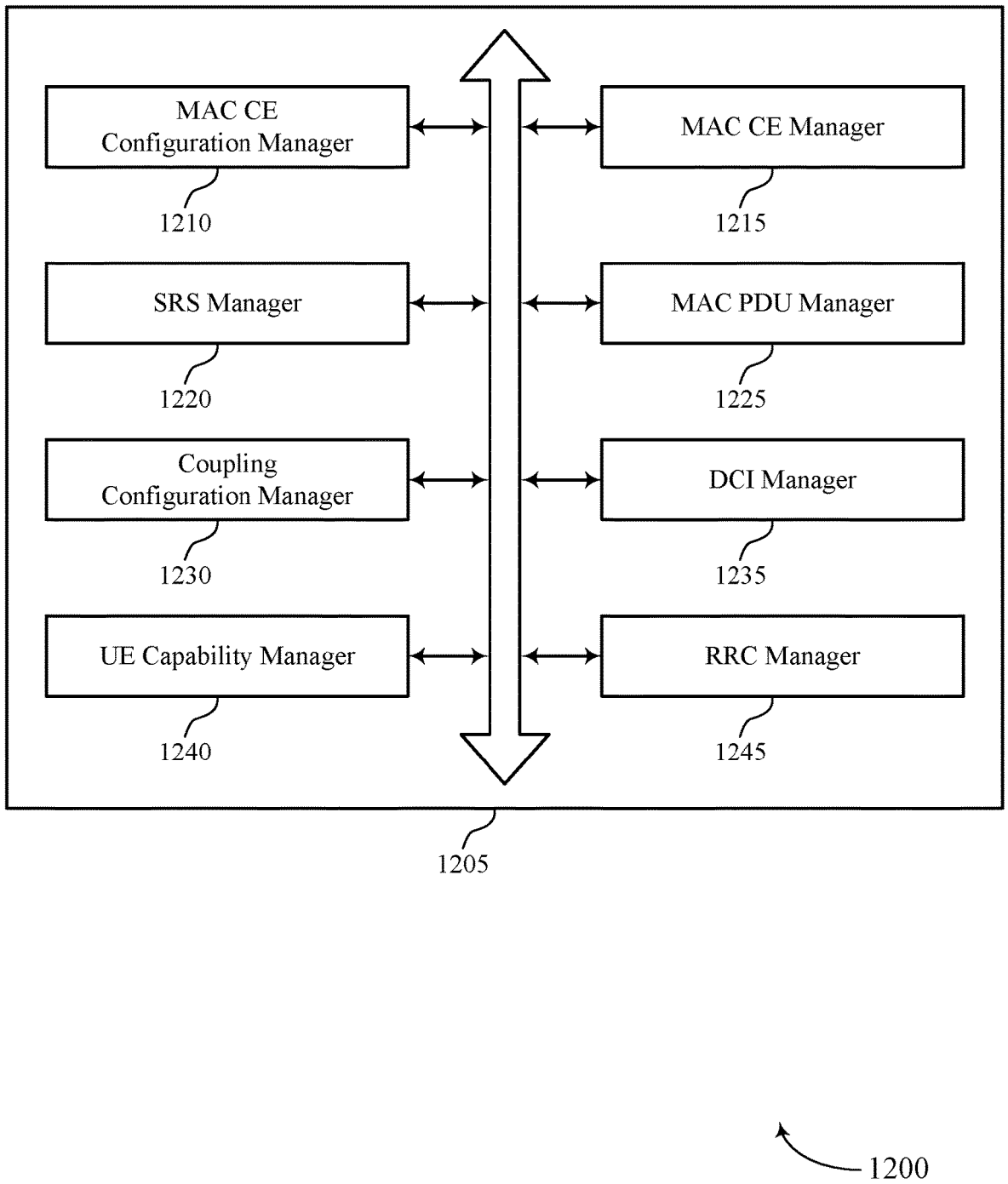
FIG. 12 shows a block diagram of a communications manager that supports MAC CE triggering and MAC CE configuration of SRS in accordance with aspects of the present disclosure.

FIG. 12 shows a block diagram 1200 of a communications manager 1205 that supports MAC CE triggering and MAC CE configuration of SRS in accordance with aspects of the present disclosure. The communications manager 1205 may be an example of aspects of a communications manager 1015, a communications manager 1115, or a communications manager 1310 described herein. The communications manager 1205 may include a MAC CE configuration manager 1210, a MAC CE manager 1215, an SRS manager 1220, a MAC PDU manager 1225, a coupling configuration manager 1230, a DCI manager 1235, a UE capability manager 1240, and an RRC manager 1245. Each of these modules may communicate, directly or indirectly, with one another (e.g., via one or more buses).

The MAC CE configuration manager 1210 may transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. In some examples, the MAC CE configuration manager 1210 may transmit the configuration for the UE to use to receive MAC CEs based on the received UE capability indication. In some cases, the configuration for the UE to use to receive MAC CEs is transmitted in DCI, or RRC signaling, a different MAC CE, or a NAS message, or a combination thereof.

The MAC CE manager 1215 may transmit, to the UE according to the transmitted configuration, a MAC CE that includes at least one SRS configuration parameter of the set of SRS configuration parameters. In some cases, the MAC CE is transmitted to trigger the SRS transmission.

The SRS manager 1220 may receive an SRS transmitted by the UE according to the SRS configuration parameter. In some examples, the SRS manager 1220 may receive the SRS transmitted by the UE according to the SRS configuration parameter and the at least one additional SRS parameter. In some cases, the time offset indicates a delay for updating an SRS configuration from a time of reception of the DCI coupled to the MAC CE. In some cases, the time offset indicates a delay for updating the SRS configuration from a time of reception of the MAC CE.

The MAC PDU manager 1225 may transmit a MAC PDU that includes the MAC CE and an indication of a presence of the MAC CE in the MAC PDU. In some examples, transmitting a MAC PDU that includes a header and the MAC CE, the header indicating the DCI coupling configuration.

The coupling configuration manager 1230 may identify a DCI coupling configuration that indicates a DCI coupled to the MAC CE. In some cases, the DCI coupling configuration indicates the DCI last transmitted before the MAC CE, or the DCI next transmitted after the MAC CE, or a time window the DCI was transmitted in, or a time window the DCI will be transmitted in. In some cases, the transmitted MAC CE indicates the DCI coupling configuration.

The DCI manager 1235 may transmit the indicated DCI, the DCI including at least one additional SRS configuration parameter for SRS transmissions by the UE. In some cases, the at least one additional SRS configuration parameter indicates one or more RBs, or one or more symbols, or a periodicity, or a cyclic shift, or a hopping configuration, or a sequence configuration, or a sequence hopping configuration, or one or more power control parameters, or a repetition configuration, or an SRS density, or a RE offset, or a time offset for updating an SRS configuration from a time a DCI coupled to the MAC CE is received, or a time offset for updating an SRS configuration for SRS transmission from a time the MAC CE is received, or a combination thereof.

The UE capability manager 1240 may receive a UE capability indication.

The RRC manager 1245 may transmit RRC signaling that includes at least one additional SRS configuration parameter. In some cases, the at least one additional SRS configuration parameter includes a set of SRS configuration parameters and a corresponding SRS resource identifier, and the SRS configuration parameter of the MAC CE includes an indication of the SRS resource identifier.

Figure 13:
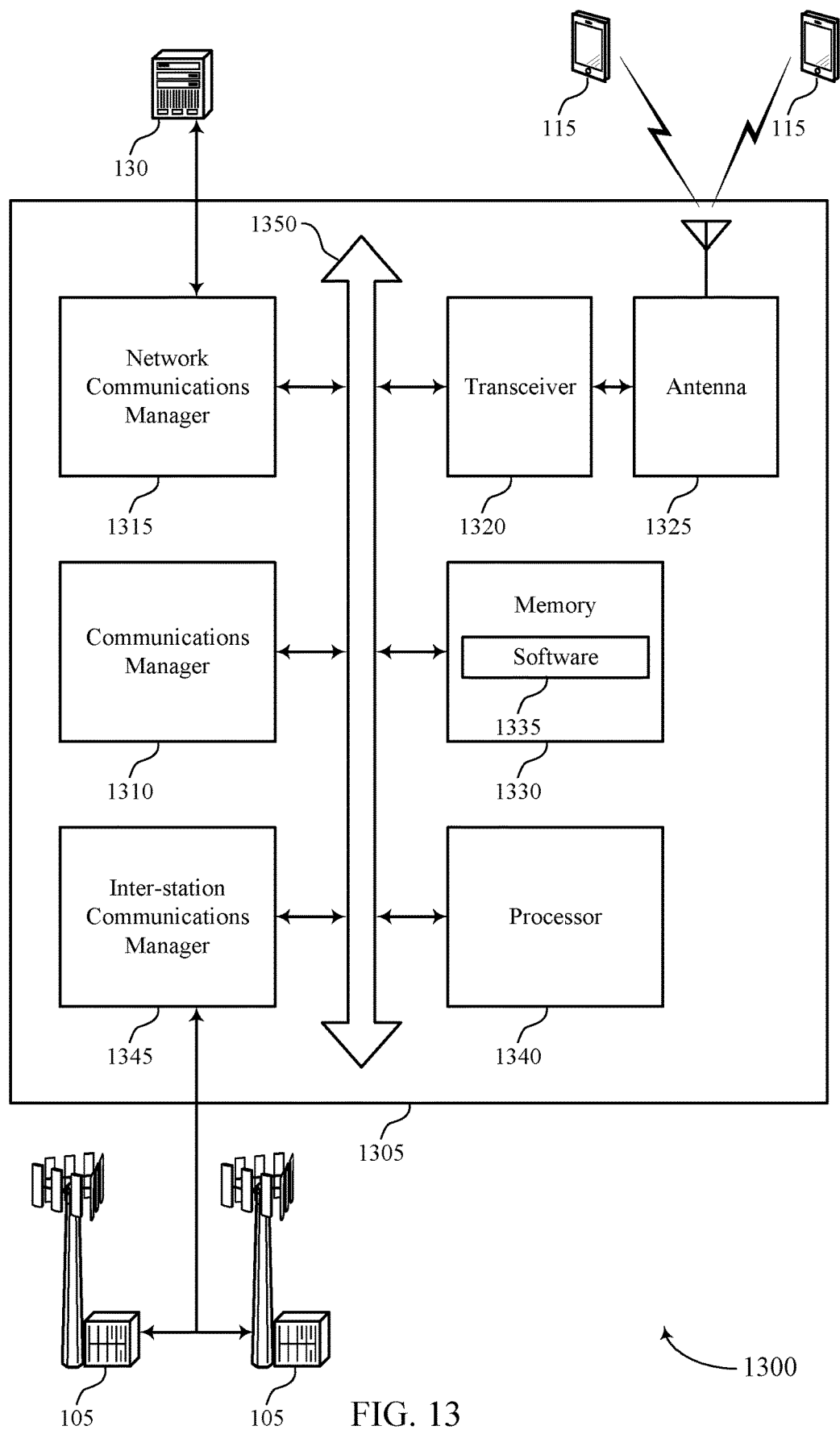
FIG. 13 shows a diagram of a system including a device that supports MAC CE triggering and MAC CE configuration of SRS in accordance with aspects of the present disclosure.

FIG. 13 shows a diagram of a system 1300 including a device 1305 that supports MAC CE triggering and MAC CE configuration of SRS in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof, transmit, to the UE according to the transmitted configuration, a MAC CE that includes at least one SRS configuration parameter of the set of SRS configuration parameters, and receive an SRS transmitted by the UE according to the SRS configuration parameter.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting MAC CE triggering and MAC CE configuration of SRS).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
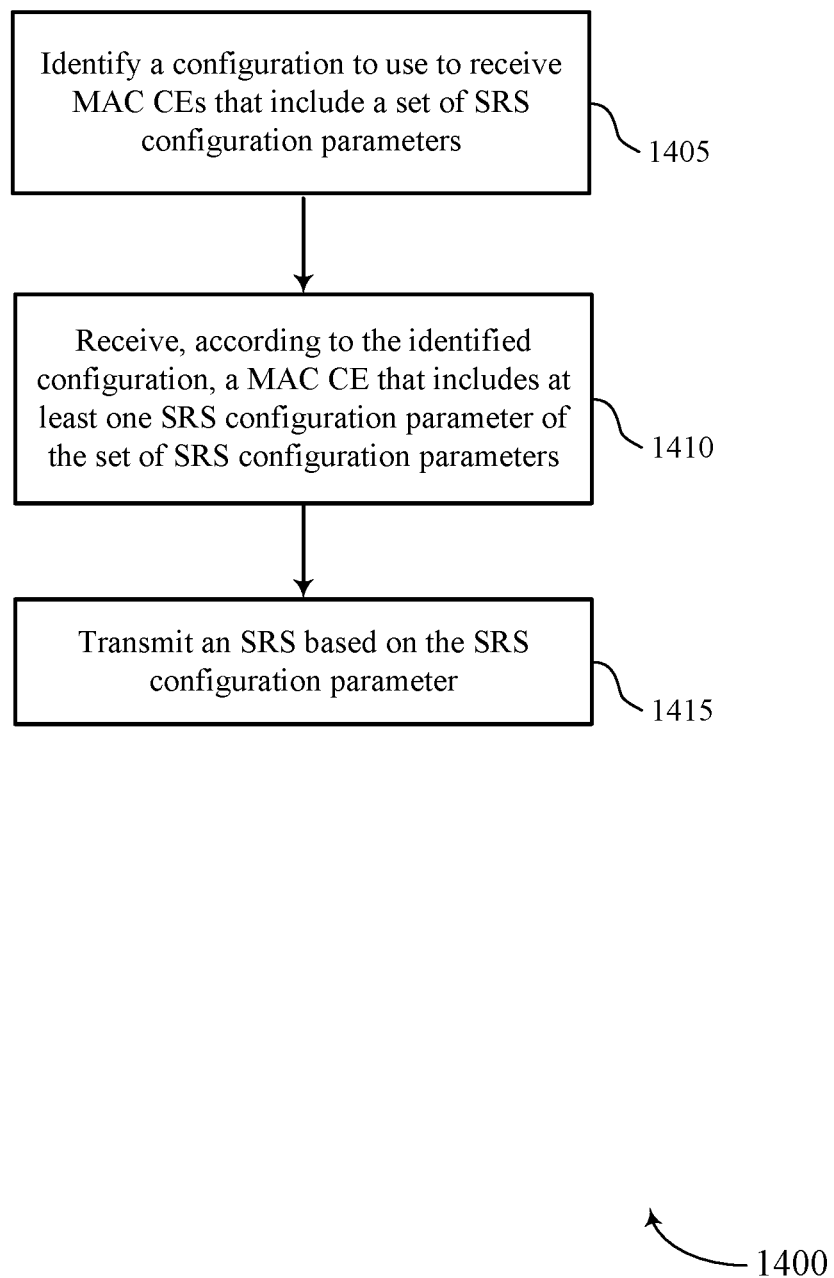
FIGS. 14 through 18 show flowcharts illustrating methods that support MAC CE triggering and MAC CE configuration of SRS in accordance with aspects of the present disclosure.

FIG. 14 shows a flowchart illustrating a method 1400 that supports MAC CE triggering and MAC CE configuration of SRS in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a configuration to use to receive MAC CEs that include a set of SRS configuration parameters. The operations of 1405 may be performed according to the methods described herein. In some examples, aspects of the operations of 1405 may be performed by a MAC CE configuration manager as described with reference to FIGS. 6 through 9.

At 1410, the UE may receive, according to the identified configuration, a MAC CE that includes at least one SRS configuration parameter of the set of SRS configuration parameters. The operations of 1410 may be performed according to the methods described herein. In some examples, aspects of the operations of 1410 may be performed by a MAC CE manager as described with reference to FIGS. 6 through 9.

At 1415, the UE may transmit an SRS based on the SRS configuration parameter. The operations of 1415 may be performed according to the methods described herein. In some examples, aspects of the operations of 1415 may be performed by an SRS manager as described with reference to FIGS. 6 through 9.

Figure 15:
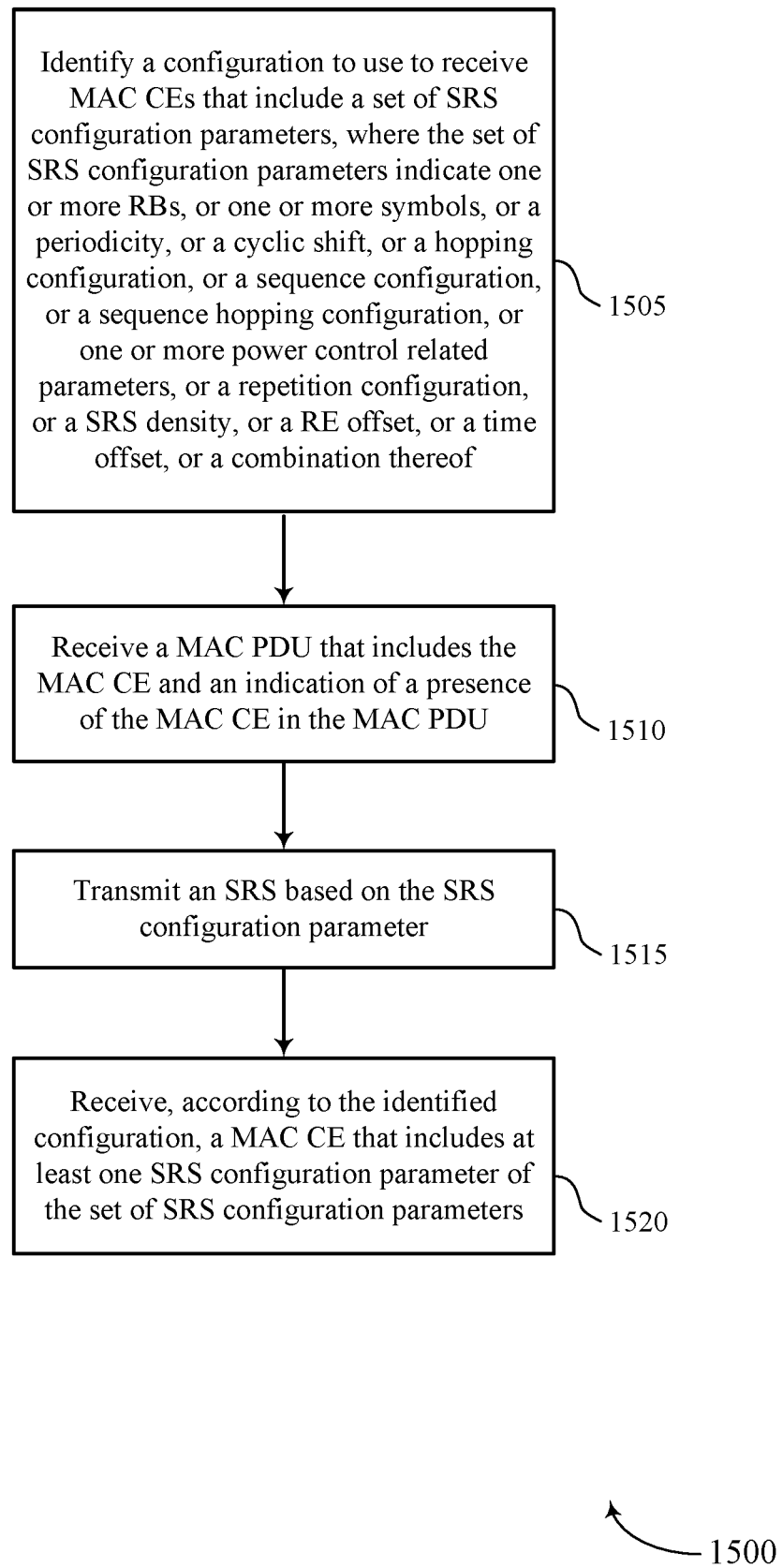

FIG. 15 shows a flowchart illustrating a method 1500 that supports MAC CE triggering and MAC CE configuration of SRS in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The operations of 1505 may be performed according to the methods described herein. In some examples, aspects of the operations of 1505 may be performed by a MAC CE configuration manager as described with reference to FIGS. 6 through 9.

At 1510, the UE may receive a MAC PDU that includes the MAC CE and an indication of a presence of the MAC CE in the MAC PDU. The operations of 1510 may be performed according to the methods described herein. In some examples, aspects of the operations of 1510 may be performed by a MAC CE manager as described with reference to FIGS. 6 through 9.

At 1515, the UE may receive, according to the identified configuration, a MAC CE that includes at least one SRS configuration parameter of the set of SRS configuration parameters. The operations of 1515 may be performed according to the methods described herein. In some examples, aspects of the operations of 1515 may be performed by an SRS manager as described with reference to FIGS. 6 through 9.

At 1520, the UE may transmit an SRS based on the SRS configuration parameter. The operations of 1520 may be performed according to the methods described herein. In some examples, aspects of the operations of 1520 may be performed by a MAC PDU manager as described with reference to FIGS. 6 through 9.

Figure 16:
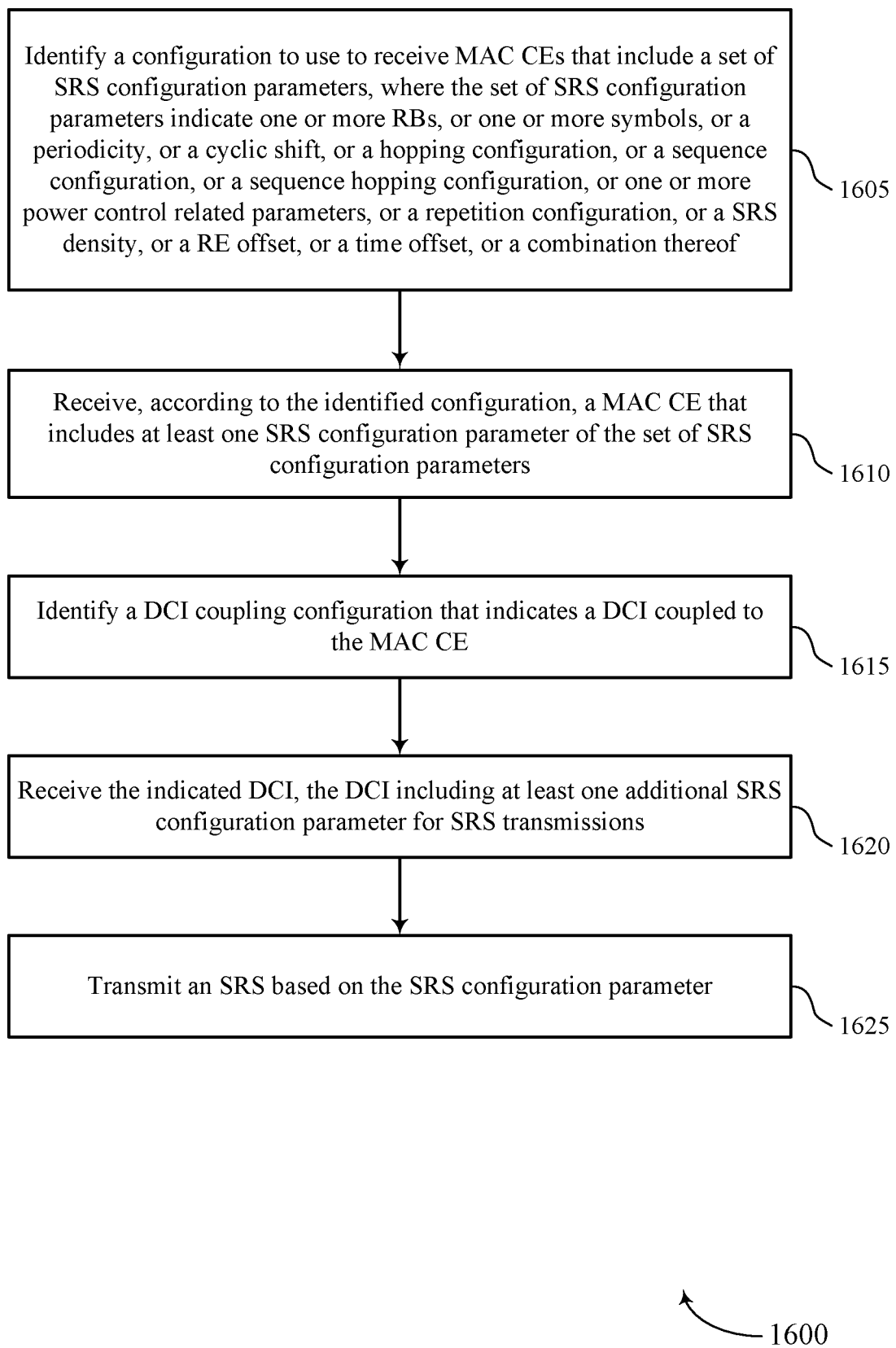

FIG. 16 shows a flowchart illustrating a method 1600 that supports MAC CE triggering and MAC CE configuration of SRS in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a configuration to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The operations of 1605 may be performed according to the methods described herein. In some examples, aspects of the operations of 1605 may be performed by a MAC CE configuration manager as described with reference to FIGS. 6 through 9.

At 1610, the UE may receive, according to the identified configuration, a MAC CE that includes at least one SRS configuration parameter of the set of SRS configuration parameters. The operations of 1610 may be performed according to the methods described herein. In some examples, aspects of the operations of 1610 may be performed by a MAC CE manager as described with reference to FIGS. 6 through 9.

At 1615, the UE may identify a DCI coupling configuration that indicates a DCI coupled to the MAC CE. The operations of 1615 may be performed according to the methods described herein. In some examples, aspects of the operations of 1615 may be performed by a coupling configuration manager as described with reference to FIGS. 6 through 9.

At 1620, the UE may receive the indicated DCI, the DCI including at least one additional SRS configuration parameter for SRS transmissions. The operations of 1620 may be performed according to the methods described herein. In some examples, aspects of the operations of 1620 may be performed by a DCI manager as described with reference to FIGS. 6 through 9.

At 1625, the UE may transmit an SRS based on the SRS configuration parameter. The operations of 1625 may be performed according to the methods described herein. In some examples, aspects of the operations of 1625 may be performed by an SRS manager as described with reference to FIGS. 6 through 9.

Figure 17:
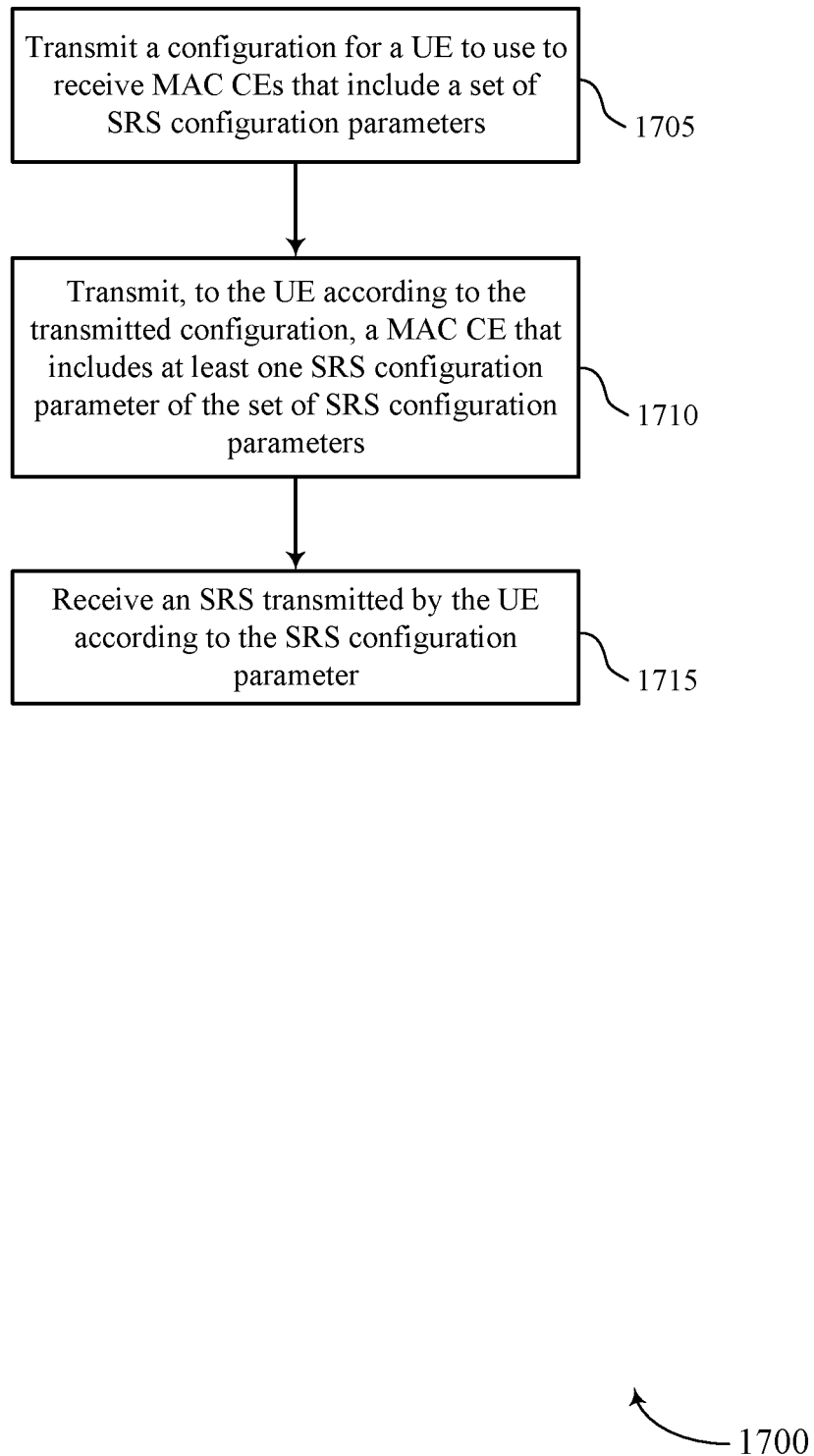

FIG. 17 shows a flowchart illustrating a method 1700 that supports MAC CE triggering and MAC CE configuration of SRS in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit a configuration for a UE to use to receive MAC CEs that include a set of SRS configuration parameters. The operations of 1705 may be performed according to the methods described herein. In some examples, aspects of the operations of 1705 may be performed by a MAC CE configuration manager as described with reference to FIGS. 10 through 13.

At 1710, the base station may transmit, to the UE according to the transmitted configuration, a MAC CE that includes at least one SRS configuration parameter of the set of SRS configuration parameters. The operations of 1710 may be performed according to the methods described herein. In some examples, aspects of the operations of 1710 may be performed by a MAC CE manager as described with reference to FIGS. 10 through 13.

At 1715, the base station may receive an SRS transmitted by the UE according to the SRS configuration parameter. The operations of 1715 may be performed according to the methods described herein. In some examples, aspects of the operations of 1715 may be performed by an SRS manager as described with reference to FIGS. 10 through 13.

Figure 18:
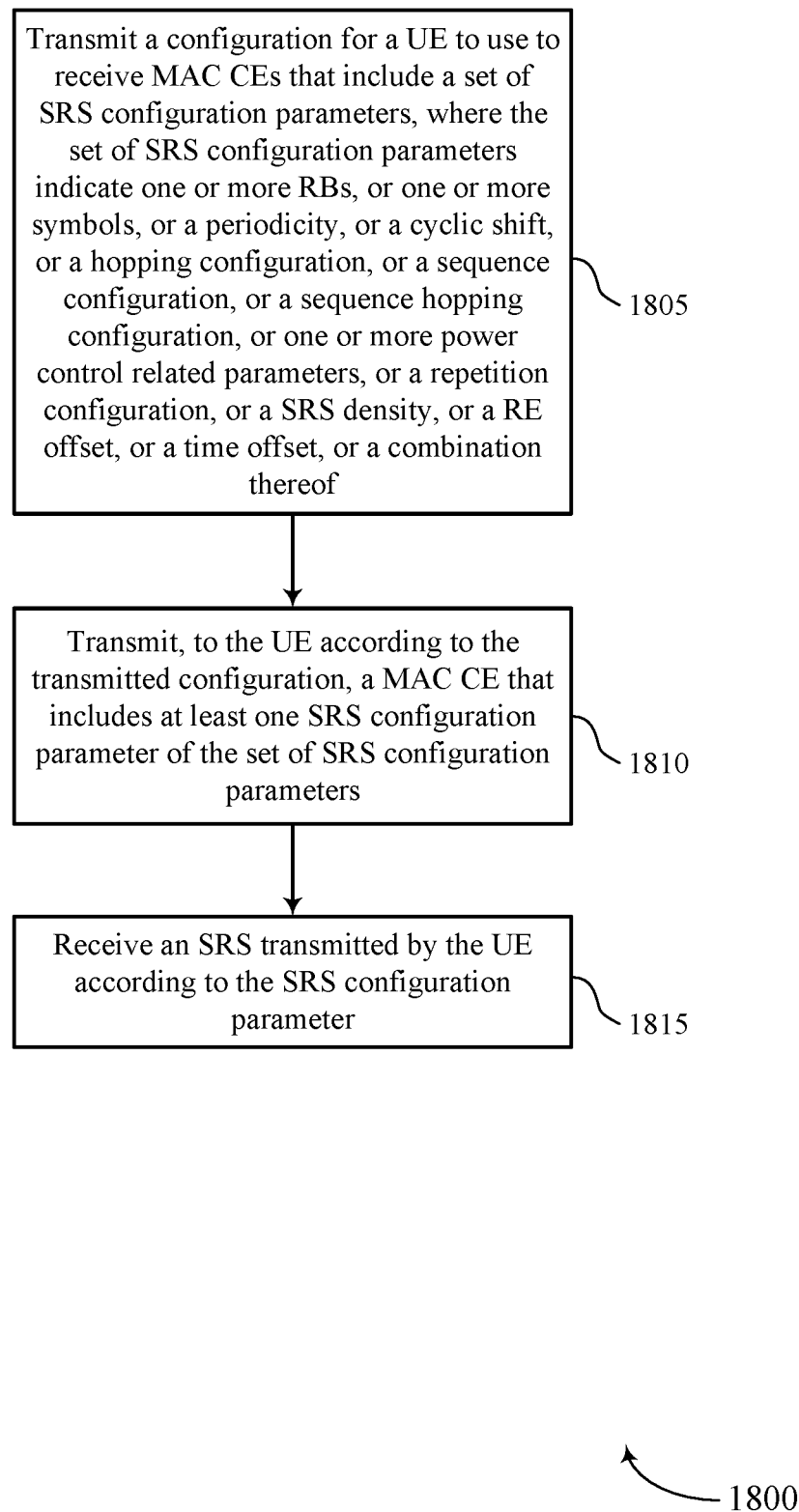

FIG. 18 shows a flowchart illustrating a method 1800 that supports MAC CE triggering and MAC CE configuration of SRS in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit a configuration for a UE to use to receive MAC CEs that include a set of SRS configuration parameters, where the set of SRS configuration parameters indicate one or more RBs, or one or more symbols, or a periodicity, or a cyclic shift, or a hopping configuration, or a sequence configuration, or a sequence hopping configuration, or one or more power control related parameters, or a repetition configuration, or an SRS density, or a RE offset, or a time offset, or a combination thereof. The operations of 1805 may be performed according to the methods described herein. In some examples, aspects of the operations of 1805 may be performed by a MAC CE configuration manager as described with reference to FIGS. 10 through 13.

At 1810, the base station may transmit, to the UE according to the transmitted configuration, a MAC CE that includes at least one SRS configuration parameter of the set of SRS configuration parameters. The operations of 1810 may be performed according to the methods described herein. In some examples, aspects of the operations of 1810 may be performed by a MAC CE manager as described with reference to FIGS. 10 through 13.

At 1815, the base station may receive an SRS transmitted by the UE according to the SRS configuration parameter. The operations of 1815 may be performed according to the methods described herein. In some examples, aspects of the operations of 1815 may be performed by an SRS manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-orthogonal frequency division multiplexing (OFDM), etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a configuration to use to receive media access control (MAC) control elements (CEs) that include a set of sounding reference signal (SRS) configuration parameters, wherein the set of SRS configuration parameters indicate one or more resource blocks (RBs), or one or more symbols, or a periodicity, or a cyclic shift, or a hopping configuration, or a sequence configuration, or a sequence hopping configuration, or one or more power control related parameters, or a repetition configuration, or an SRS density, or a resource element (RE) offset, or a time offset, or a combination thereof;
   receiving, according to the identified configuration, a MAC CE that includes at least one SRS configuration parameter of the set of SRS configuration parameters; and
   transmitting an SRS based at least in part on the SRS configuration parameter.

2. The method of claim 1, further comprising:
   receiving a MAC packet data unit (PDU) that comprises the MAC CE and an indication of a presence of the MAC CE in the MAC PDU.

3. The method of claim 1, further comprising:
   identifying a downlink control information (DCI) coupling configuration that indicates a DCI coupled to the MAC CE; and
   receiving the indicated DCI coupled to the MAC CE, the DCI comprising at least one additional SRS configuration parameter for SRS transmissions.

4. The method of claim 3, wherein the DCI coupling configuration indicates the DCI last received before the MAC CE, or the DCI next received after the MAC CE, or a time window to receive the DCI.

5. The method of claim 3, wherein receiving the MAC CE comprises:
   receiving a MAC packet data unit (PDU) that comprises a header and the MAC CE, the header indicating the DCI coupling configuration.

6. The method of claim 3, wherein the received MAC CE indicates the DCI coupling configuration.

7. The method of claim 3, wherein transmitting the SRS comprises:
   transmitting the SRS based at least in part on the SRS configuration parameter and the at least one additional SRS configuration parameter.

8. The method of claim 3, wherein the time offset indicates a delay for updating an SRS configuration from a time of reception of the DCI coupled to the MAC CE, or from a time of reception of the MAC CE, or a combination thereof.

9. The method of claim 3, wherein the at least one additional SRS configuration parameter indicates one or more resource blocks (RBs), or one or more symbols, or a periodicity, or a cyclic shift, or a hopping configuration, or a sequence configuration, or a sequence hopping configuration, or one or more power control parameters, or a repetition configuration, or an SRS density, or a resource element (RE) offset, a time offset for updating an SRS configuration from a time a DCI coupled to the MAC CE is received, or a time offset for updating an SRS configuration for SRS transmission from a time the MAC CE is received, or a combination thereof.

10. The method of claim 1, further comprising:
updating an SRS configuration based at least in part on the SRS configuration parameter indicated by the MAC CE; and
transmitting the SRS based at least in part on the updated SRS configuration.

11. The method of claim 1, further comprising:
receiving the configuration to use to receive MAC CEs in downlink control information (DCI), or radio resource control (RRC) signaling, a different MAC CE, or a non-access stratum (NAS) message, or a combination thereof.

12. The method of claim 1, further comprising:
transmitting a UE capability indication; and
receiving the configuration to use to receive MAC CEs based at least in part on the transmitted UE capability indication.

13. The method of claim 1, further comprising:
receiving radio resource control (RRC) signaling that comprises at least one additional SRS configuration parameter.

14. The method of claim 13, wherein the at least one additional SRS configuration parameter comprises a set of SRS configuration parameters and a corresponding SRS resource identifier, and the SRS configuration parameter of the MAC CE comprises an indication of the SRS resource identifier.

15. A method for wireless communication at a base station, comprising:
transmitting a configuration for a user equipment (UE) to use to receive media access control (MAC) control elements (CEs) that include a set of sounding reference signal (SRS) configuration parameters, wherein the set of SRS configuration parameters indicate one or more resource blocks (RBs), or one or more symbols, or a periodicity, or a cyclic shift, or a hopping configuration, or a sequence configuration, or a sequence hopping configuration, or one or more power control related parameters, or a repetition configuration, or an SRS density, or a resource element (RE) offset, or a time offset, or a combination thereof;
transmitting, to the UE according to the transmitted configuration, a MAC CE that includes at least one SRS configuration parameter of the set of SRS configuration parameters; and
receiving an SRS transmitted by the UE according to the SRS configuration parameter.

16. The method of claim 15, further comprising:
transmitting a MAC packet data unit (PDU) that comprises the MAC CE and an indication of a presence of the MAC CE in the MAC PDU.

17. The method of claim 15, further comprising:
identifying a downlink control information (DCI) coupling configuration that indicates a DCI coupled to the MAC CE; and
transmitting the indicated DCI coupled to the MAC CE, the DCI comprising at least one additional SRS configuration parameter for SRS transmissions by the UE.

18. The method of claim 17, wherein the DCI coupling configuration indicates the DCI last transmitted before the MAC CE, or the DCI next transmitted after the MAC CE, or a time window the DCI was transmitted in, or a time window the DCI will be transmitted in.

19. The method of claim 17, wherein transmitting the MAC CE comprises:
transmitting a MAC packet data unit (PDU) that comprises a header and the MAC CE, the header indicating the DCI coupling configuration.

20. The method of claim 17, wherein the transmitted MAC CE indicates the DCI coupling configuration.

21. The method of claim 17, wherein receiving the SRS comprises:
receiving the SRS transmitted by the UE according to the SRS configuration parameter and the at least one additional SRS configuration parameter.

22. The method of claim 17, wherein the time offset indicates a delay for updating an SRS configuration from a time of reception of the DCI coupled to the MAC CE.

23. The method of claim 17, wherein the at least one additional SRS configuration parameter indicates one or more resource blocks (RBs), or one or more symbols, or a periodicity, or a cyclic shift, or a hopping configuration, or a sequence configuration, or a sequence hopping configuration, or one or more power control parameters, or a repetition configuration, or an SRS density, or a resource element (RE) offset, or a time offset for updating an SRS configuration from a time a DCI coupled to the MAC CE is received, or a time offset for updating an SRS configuration for SRS transmission from a time the MAC CE is received, or a combination thereof.

24. The method of claim 23, wherein the time offset indicates a delay for updating the SRS configuration from a time of reception of the MAC CE.

25. The method of claim 15, wherein the configuration for the UE to use to receive MAC CEs is transmitted in downlink control information (DCI), or radio resource control (RRC) signaling, a different MAC CE, or a non-access stratum (NAS) message, or a combination thereof.

26. The method of claim 15, further comprising:
receiving a UE capability indication; and
transmitting the configuration for the UE to use to receive MAC CEs based at least in part on the received UE capability indication.

27. The method of claim 15, further comprising:
transmitting radio resource control (RRC) signaling that comprises at least one additional SRS configuration parameter.

28. The method of claim 27, wherein the at least one additional SRS configuration parameter comprises a set of SRS configuration parameters and a corresponding SRS resource identifier, and the SRS configuration parameter of the MAC CE comprises an indication of the SRS resource identifier.

29. An apparatus for wireless communication at a user equipment (UE), comprising:

a processor, memory in electronic communication with the processor; and instructions stored in the memory and executable by the processor to cause the apparatus to:

identify a configuration to use to receive media access control (MAC) control elements (CEs) that include a set of sounding reference signal (SRS) configuration parameters, wherein the set of SRS configuration parameters indicate one or more resource blocks (RBs), or one or more symbols, or a periodicity, or a cyclic shift, or a hopping configuration, or a sequence configuration, or a sequence hopping configuration, or one or more power control related parameters, or a repetition configuration, or an SRS density, or a resource element (RE) offset, or a time offset, or a combination thereof;

receive, according to the identified configuration, a MAC CE that includes at least one SRS configuration parameter of the set of SRS configuration parameters; and transmit an SRS based at least in part on the SRS configuration parameter.

30. An apparatus for wireless communication at a base station, comprising:

a processor, memory in electronic communication with the processor; and instructions stored in the memory and executable by the processor to cause the apparatus to:

transmit a configuration for a user equipment (UE) to use to receive media access control (MAC) control elements (CEs) that include a set of sounding reference signal (SRS) configuration parameters, wherein the set of SRS configuration parameters indicate one or more resource blocks (RBs), or one or more symbols, or a periodicity, or a cyclic shift, or a hopping configuration, or a sequence configuration, or a sequence hopping configuration, or one or more power control related parameters, or a repetition configuration, or an SRS density, or a resource element (RE) offset, or a time offset, or a combination thereof;

transmit, to the UE according to the transmitted configuration, a MAC CE that includes at least one SRS configuration parameter of the set of SRS configuration parameters; and receive an SRS transmitted by the UE according to the SRS configuration parameter.

\* \* \* \* \*